(12) United States Patent
Tokunaga et al.

(10) Patent No.: US 8,878,944 B2
(45) Date of Patent: Nov. 4, 2014

(54) IMAGE PROCESSING APPARATUS AND METHOD, IMAGE PROCESSING SYSTEM AND PROGRAM

(71) Applicants: Sony Corporation, Tokyo (JP); Sony Computer Entertainment Inc., Tokyo (JP)

(72) Inventors: Nodoka Tokunaga, Tokyo (JP); Hideki Oyaizu, Tokyo (JP); Yoshihiro Myokan, Kanagawa (JP); Hidehiko Ogasawara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/044,215

(22) Filed: Oct. 2, 2013

(65) Prior Publication Data
US 2014/0125819 A1    May 8, 2014

(30) Foreign Application Priority Data
Nov. 2, 2012 (JP) ................................. 2012-243179

(51) Int. Cl.
*H04N 17/00* (2006.01)
*H04N 13/02* (2006.01)

(52) U.S. Cl.
CPC ................................. *H04N 13/0246* (2013.01)
USPC .......................................... 348/188; 348/187

(58) Field of Classification Search
USPC .................. 348/187, 188, 135, 139, 182, 180
IPC .................................... H04N 17/00,17/02, 7/18
See application file for complete search history.

(56) References Cited

U.S. PATENT DOCUMENTS

| | | | |
|---|---|---|---|
| 6,404,484 B1 * | 6/2002 | Sogawa | 356/3.14 |
| 6,785,403 B1 * | 8/2004 | Murakami et al. | 348/188 |
| 8,400,505 B2 * | 3/2013 | Oyama et al. | 348/188 |

FOREIGN PATENT DOCUMENTS

| | | | |
|---|---|---|---|
| JP | 2004132870 A | * | 4/2004 |
| JP | 2006-250889 | | 9/2006 |
| JP | 2011-253376 | | 12/2011 |

* cited by examiner

*Primary Examiner* — Sherrie Hsia
(74) *Attorney, Agent, or Firm* — Sherr & Jiang, PLLC

(57) ABSTRACT

There is provided an image processing apparatus including multiple imaging units included in a stereo camera, the multiple imaging units configured to photograph a chart pattern including a pole, and a correction parameter calculation unit configured to calculate a correction parameter that corrects a gap between the multiple imaging units, based on the pole and a pattern included in the chart pattern photographed by the multiple imaging units.

13 Claims, 23 Drawing Sheets

FIG. 2
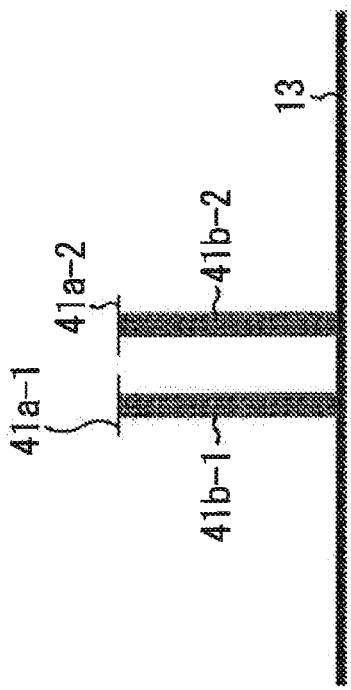
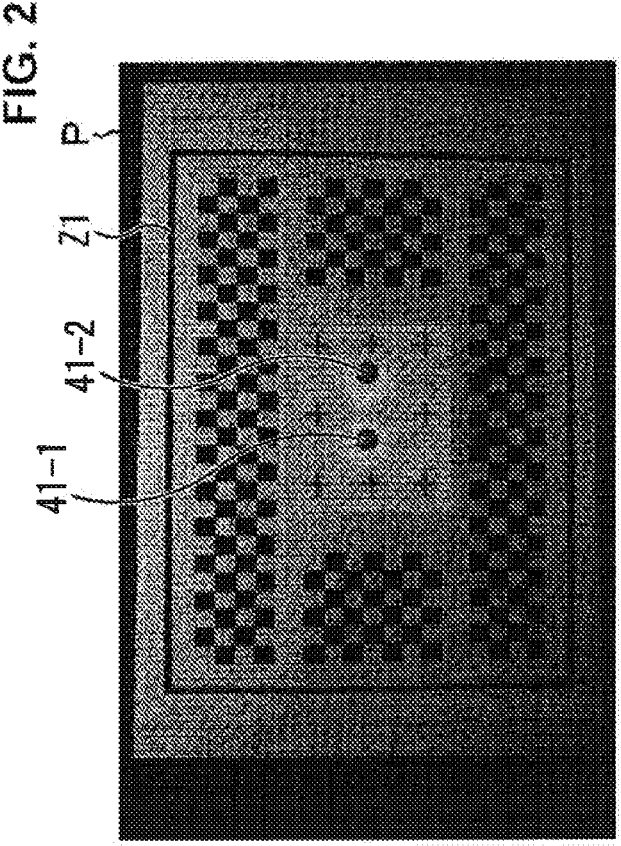
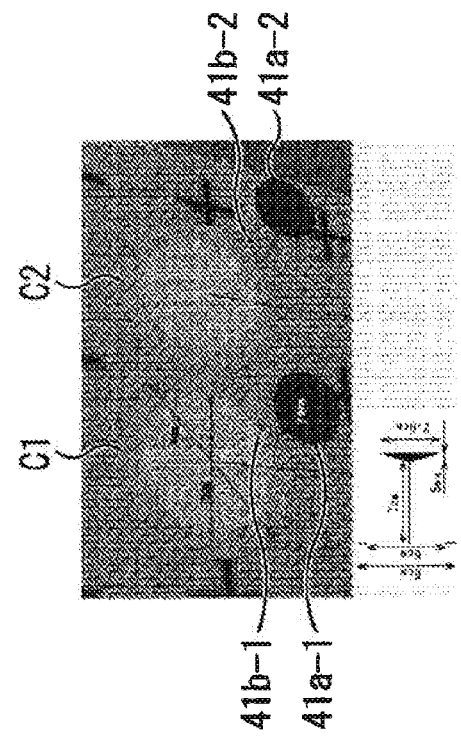

FIG. 7
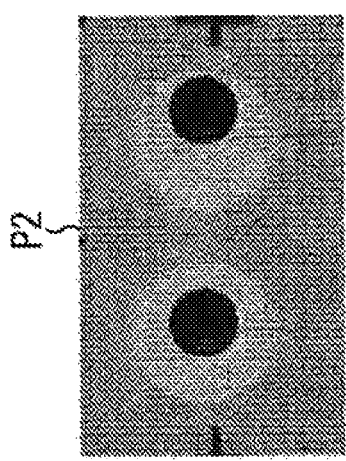
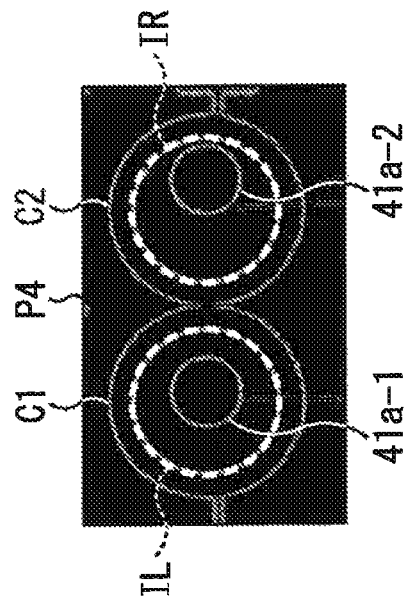
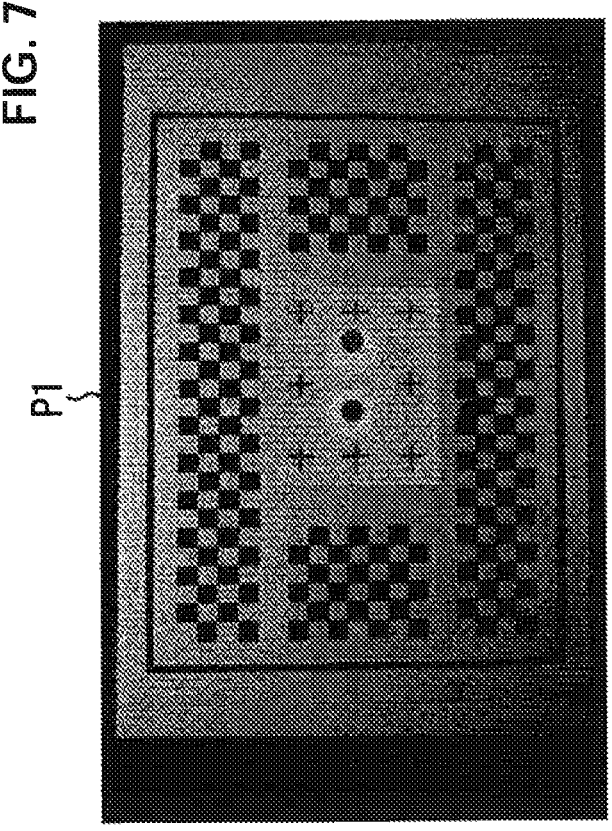
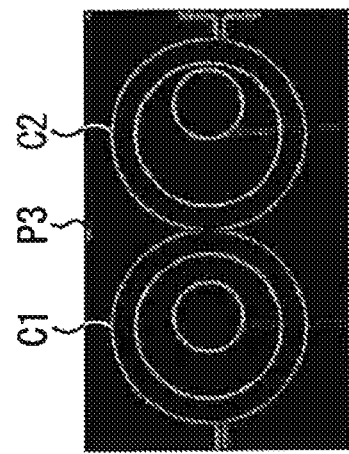

FIG. 11
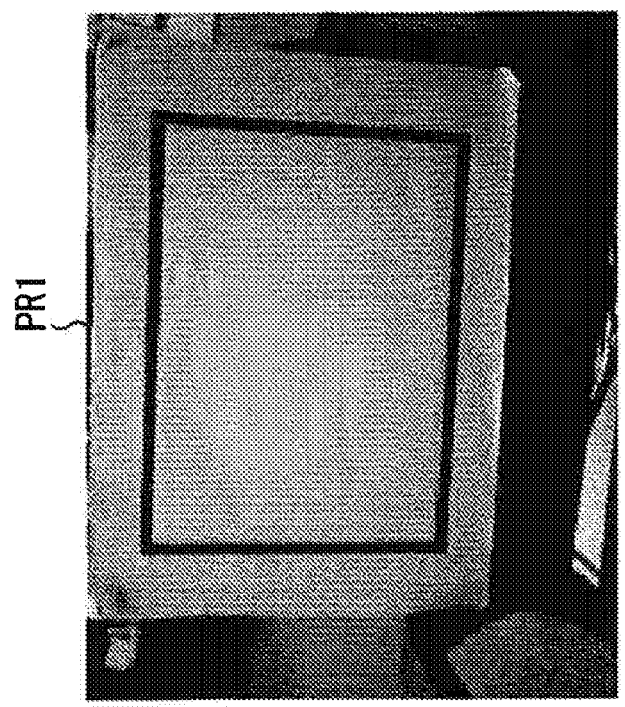
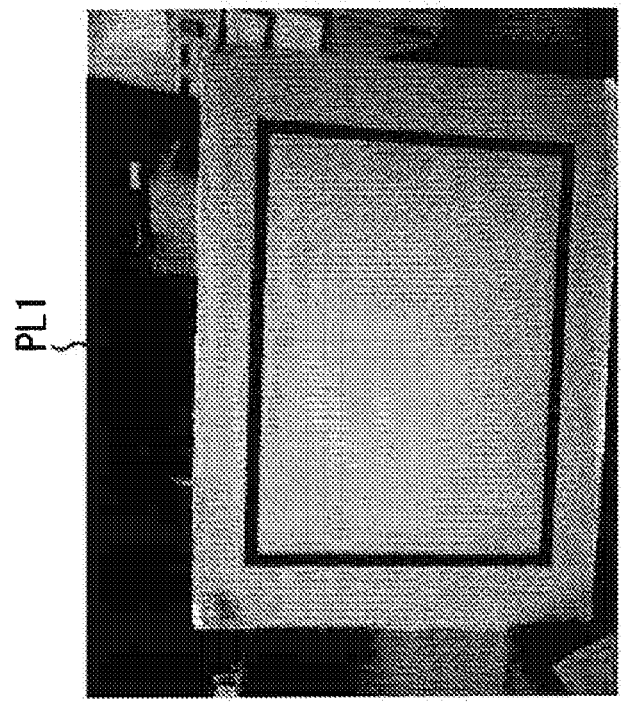

FIG. 12
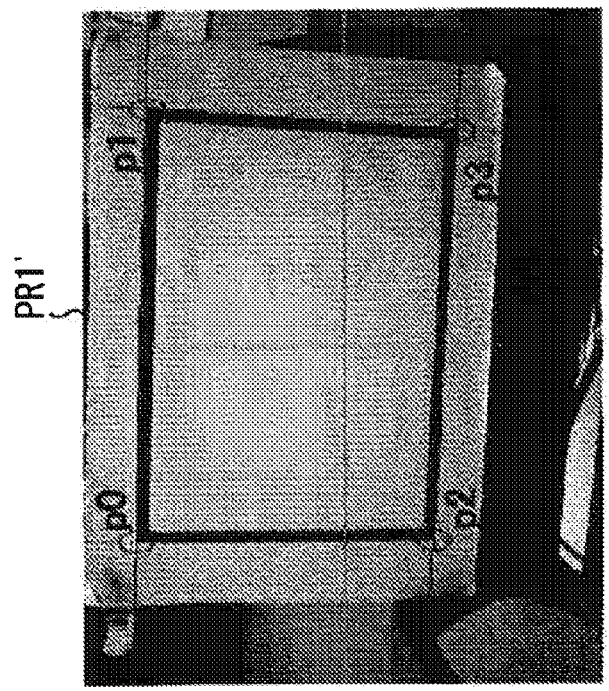
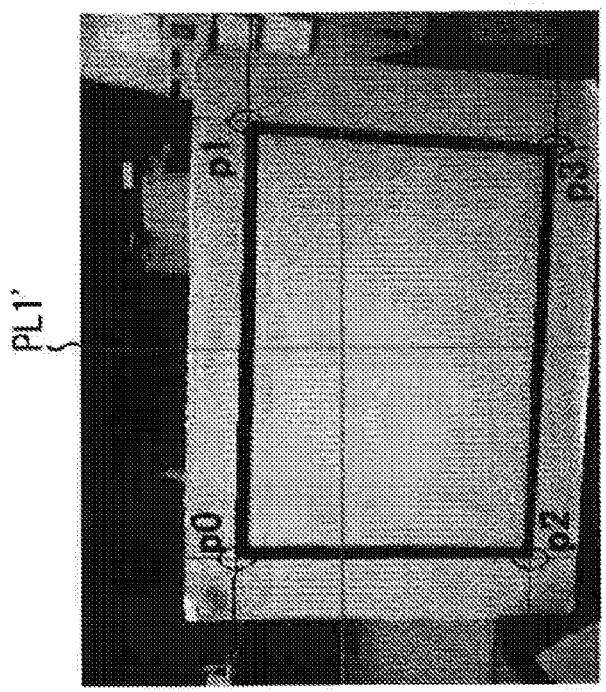

FIG. 14
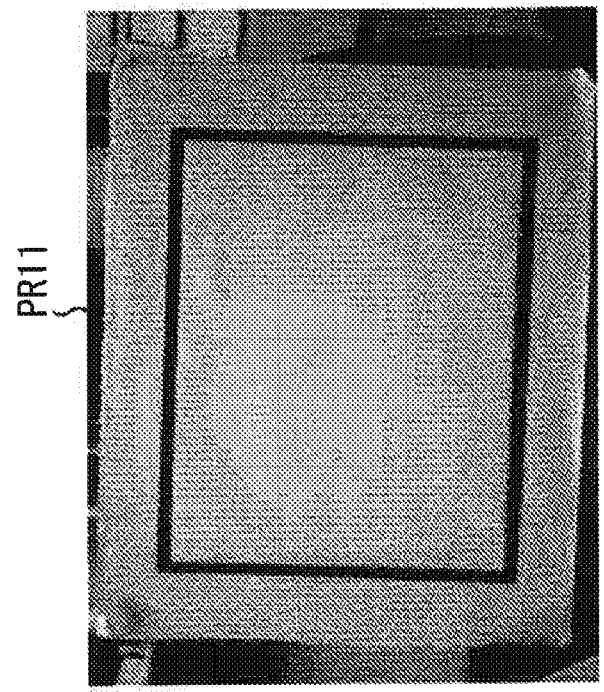
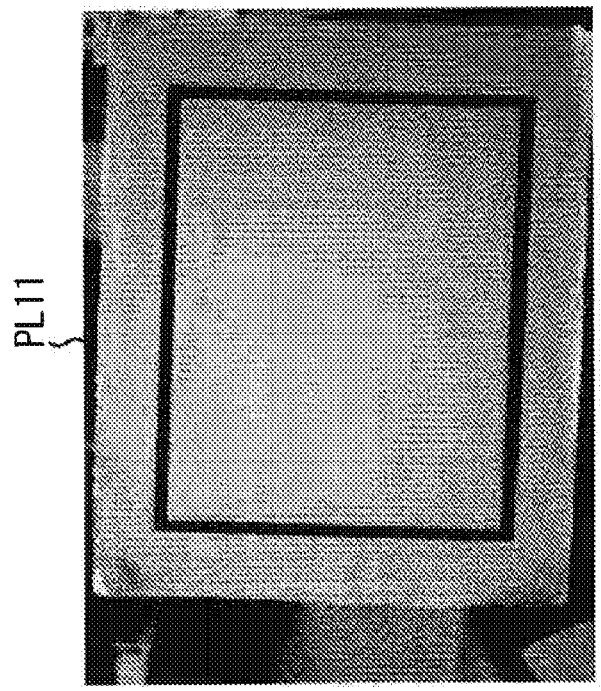

IMAGE PROCESSING APPARATUS AND METHOD, IMAGE PROCESSING SYSTEM AND PROGRAM

CROSS REFERENCE TO RELATED APPLICATIONS

This application claims the benefit of Japanese Priority Patent Application JP 2012-243179 filed Nov. 2, 2012, the entire contents of which are incorporated herein by reference.

BACKGROUND

The present disclosure relates to an image processing apparatus and method, an image processing system and a program. Specifically, the present disclosure relates to an image processing apparatus and method, image processing system and program that can easily realize calibration of multiple cameras, which photograph stereo images, at high accuracy in a small space.

In general, a technique that can photograph a three-dimensional image by the use of multiple cameras is common.

As a method of generating a three-dimensional image, there is known a general method of forming a stereo camera by setting up cameras of two different viewpoints, calculating the disparity based on images photographed by the cameras of two different viewpoints which configure the stereo camera and generating a three-dimensional image by the use of this disparity.

By the way, although it is premised that the cameras of two different viewpoints used herein is set up in an appropriate direction, it is known that a certain physical gap is generated no matter how they are set up. Therefore, generally, by taking images formed with a chart pattern with respect to respective imaging directions of the cameras of two viewpoints and calculating correction parameters by calibration in advance using the imaging results, actual imaging results are corrected by these correction parameters and used.

Various techniques to execute this calibration have been suggested so far, and, for example, it is suggested as a first method that four points of the same distance on the plane are photographed by cameras of two viewpoints to calculate a correction parameter from the photographed results (see JP 2011-253376A).

Moreover, as a second method, Patent Literature 1 suggests that a surface with different depths provided by making a hole in a chart pattern is photographed as one image and calibration processing is performed by one image to calculate a correction parameter.

Further, for example, it is suggested that a correction parameter is calculated by printing a calibration pattern on a transparent chart, arranging this in different distances, photographing these images and executing calibration processing by the use of the photographed results (see JP 2006-250889A).

SUMMARY

However, in the first method suggested in JP 2011-253376A, although calibration can be easily executed in narrow space, there is a possibility that the accuracy may be reduced if there is a tilt of the chart pattern. Especially, in the first method of JP 2011-253376A, there is a possibility that the performance by calibration between a position in which the chart pattern is arranged and a different position is decreased more.

Further, although calibration can be executed at high accuracy in both the second method of JP 2011-253376A and the method of JP 2006-250889A, wide space is demanded to execute calibration in order to improve the accuracy.

The present disclosure is made in view of such a condition, especially such that calibration can be realized at high accuracy even in narrow space by executing the calibration by the use of a chart pattern with a pole.

According to a first embodiment of the present technology, there is provided an image processing apparatus including multiple imaging units included in a stereo camera, the multiple imaging units configured to photograph a chart pattern including a pole, and a correction parameter calculation unit configured to calculate a correction parameter that corrects a gap between the multiple imaging units, based on the pole and a pattern included in the chart pattern photographed by the multiple imaging units.

The pole may include a disk portion in a tip and a side shape of the tip is T-shaped.

The image processing apparatus may further include a pole detection unit configured to detect the pole included in the chart pattern photographed by the multiple imaging units, a tilt detection unit configured to detect a tilt of the chart pattern based on the pole detected by the pole detection unit, a detection unit configured to detect a feature point based on the pattern included in the chart pattern photographed by the multiple imaging units, and a feature point correction unit configured to correct arrangement of the feature point detected by the detection unit, based on the tilt detected by the tilt detection unit. The correction parameter calculation unit may calculate the correction parameter that corrects the gap between the multiple imaging units, based on information on the feature point whose arrangement is corrected by the feature point correction unit.

The chart pattern may include a box chart and a lattice point chart.

According to the first embodiment of the present technology, there is provided an image processing method including photographing a chart pattern including a pole by multiple imaging units included in a stereo camera, and calculating a correction parameter that corrects a gap between the multiple imaging units, based on the pole and a pattern included in the chart pattern photographed by the multiple imaging units.

According to the first embodiment of the present technology, there is provided a program for causing a computer that controls an image processing apparatus to execute photographing a chart pattern including a pole by multiple imaging units included in a stereo camera, and calculating a correction parameter that corrects a gap between the multiple imaging units, based on the pole and a pattern included in the chart pattern photographed by the multiple imaging units.

According to a second embodiment of the present technology, there is provided an image processing system including an image processing apparatus configured to include multiple imaging units, and a chart pattern configured to perform calibration in an imaging direction of each of the imaging units. The chart pattern is installed in a position facing the multiple imaging units and includes a pattern as a feature point and a pole. The image processing apparatus includes the multiple imaging units that are included in a stereo camera and photograph the chart pattern, and a correction parameter calculation unit that calculates a correction parameter which corrects a gap between the multiple imaging units, based on the pole and a pattern included in the chart pattern photographed by the multiple imaging units.

According to an embodiment of the present disclosure, multiple imaging units forms a stereo camera and photographs a chart pattern including a pole, and a correction parameter that corrects a gap between the multiple imaging units is calculated based on the pole and a pattern included in the chart pattern photographed by the multiple imaging units.

According to an embodiment of the present disclosure, the image processing apparatus is formed such that multiple imaging units forming a stereo camera photograph a chart pattern which is installed in an opposite position and which includes a pattern as a feature point and a pole, and a correction parameter that corrects a gap between the multiple imaging units is calculated based on the pole and a pattern included in the chart pattern photographed by the multiple imaging units.

The image processing apparatuses and image processing systems of the embodiments of the present disclosure may be independent apparatuses and systems or blocks to perform image processing.

According to the embodiments of the present disclosure, even in limited space, it is possible to easily execute calibration at high accuracy for the imaging direction of an imaging unit that forms a stereo camera.

BRIEF DESCRIPTION OF THE DRAWINGS

FIG. 2 is a diagram to describe a pole installed in the chart pattern of FIG. 1;

FIG. 7 is a diagram to describe pole detection processing;

FIG. 11 is a diagram to describe a detection result of a chart pattern;

FIG. 12 is a diagram to describe a detection result of a chart pattern;

FIG. 14 is a diagram to describe a correction image;

DETAILED DESCRIPTION OF THE EMBODIMENT(S)

Figure 1:
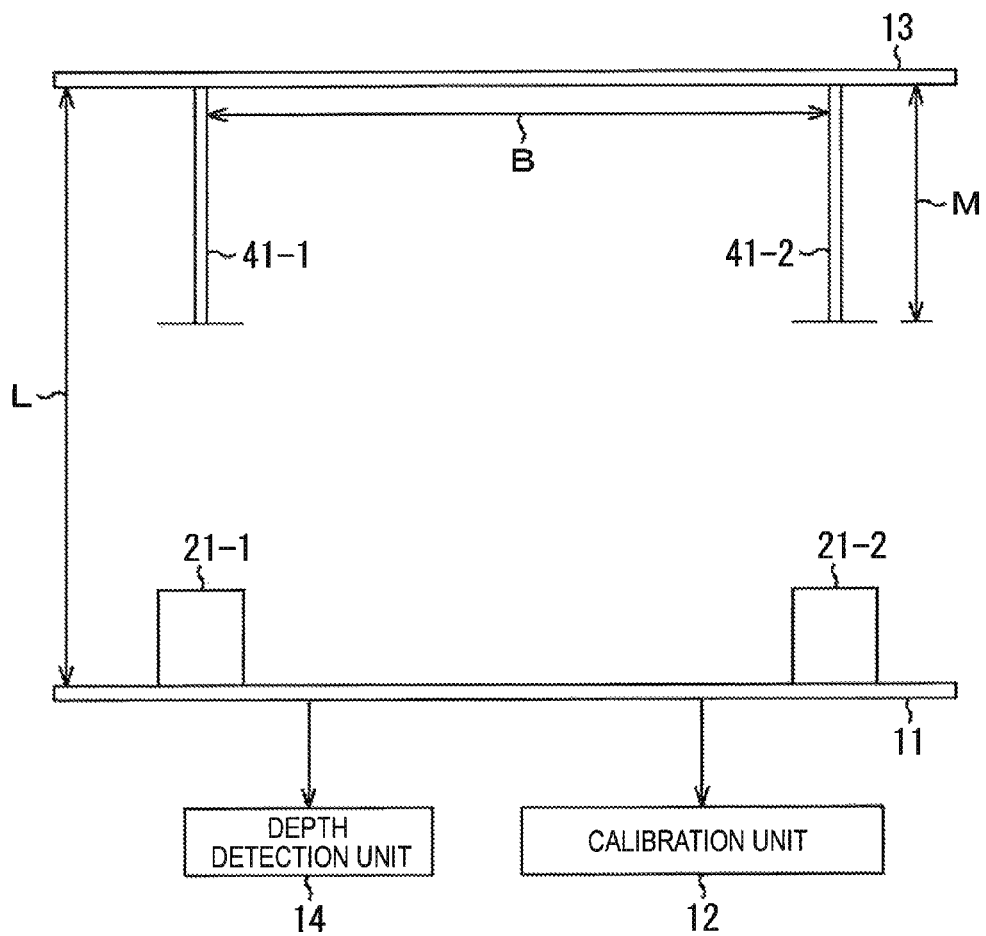
FIG. 1 is a diagram illustrating a configuration example of an embodiment of an image processing system that applies the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<Configuration Example of Image Processing System>

FIG. 1 illustrates a configuration example of an embodiment of an image processing system that applies the present disclosure. In the image processing system in FIG. 1, first, imaging units 21-1 and 21-2 of a stereo camera 11 photograph images of a chart pattern 13 in which poles 41-1 and 41-2 are installed. Subsequently, a calibration unit 12 calculates a correction parameter to correct the gap of the imaging units 21-1 and 21-2 on the basis of two photographed images and stores it in the stereo camera 11. Further, when depth detection processing is implemented by a depth detection unit 14 using the stereo camera 11, the images photographed by the imaging units 21-1 and 21-2 of the stereo camera 11 is corrected using the correction parameter and a disparity image that is the depth detection result is generated.

To be more specific, the image processing system in FIG. 1 includes the stereo camera 11, the calibration unit 12, the chart pattern 13 and the depth detection unit 14. The stereo camera 11 is horizontally arranged in a predetermined interval and includes the imaging units 21-1 and 21-2 that photograph images in the same direction. In calibration processing, the stereo camera 11 photographs images of the chart pattern 13 in which the poles 41-1 and 41-2 are installed, by the imaging units 21-1 and 21-2, supplies two photographed images to the calibration unit 12 and stores a correction parameter calculated by the calibration unit 12. Moreover, when supplying the images to the depth detection unit 14 in depth detection processing, the stereo camera 11 supplies the correction parameter stored by the calibration processing to the depth detection unit 14 together with the images.

The calibration unit 12 executes the calibration processing, calculates the correction parameter that corrects the imaging direction of the imaging units 21-1 and 21-2 on the basis of the images supplied from the stereo camera 11 and stores it in the stereo camera 11.

The chart pattern 13 is formed in which the poles 41-1 and 41-2 are installed in a planar chart pattern, and is as illustrated by image P in FIG. 2. In image P, the chart pattern is displayed in area Z1 and the poles 41-1 and 41-2 are installed in the horizontal direction at a predetermined interval in the central part. As illustrated in the side view in the right part of FIG. 2, the poles 41-1 and 41-2 are formed in which disk portions 41a-1 and 41a-2 are installed in the positions that protrude from the chart pattern 13 in the direction of the near side of the stereo camera 11 only by props 41b-1 and 41b-2, such that they are T-shaped when viewed from the side.

To be more specific, as illustrated in the left central part of FIG. 2, the props 41b-1 and 41b-2 are installed in the central parts of circular portions C1 and C2 which are patterns installed in the central part of the chart pattern 13, and the disk portions 41a-1 and 41a-2 are installed in the tips thereof. For example, each specific size is as illustrated in the left lower part of FIG. 2, that is, the diameters of the outer circles of the circular portions C1 and C2 are 8 cm, the diameters of the inner circles thereof are 6 cm, the lengths of the props 41*b*-1 and 41*b*-2 are 7 cm, the diameters of the disk portions 41*a*-1 and 41*a*-2 are 2.5 cm and the thicknesses thereof are 5 mm. Here, these sizes are not limited to the sizes illustrated in FIG. 2 and other sizes are possible.

Figure 3:
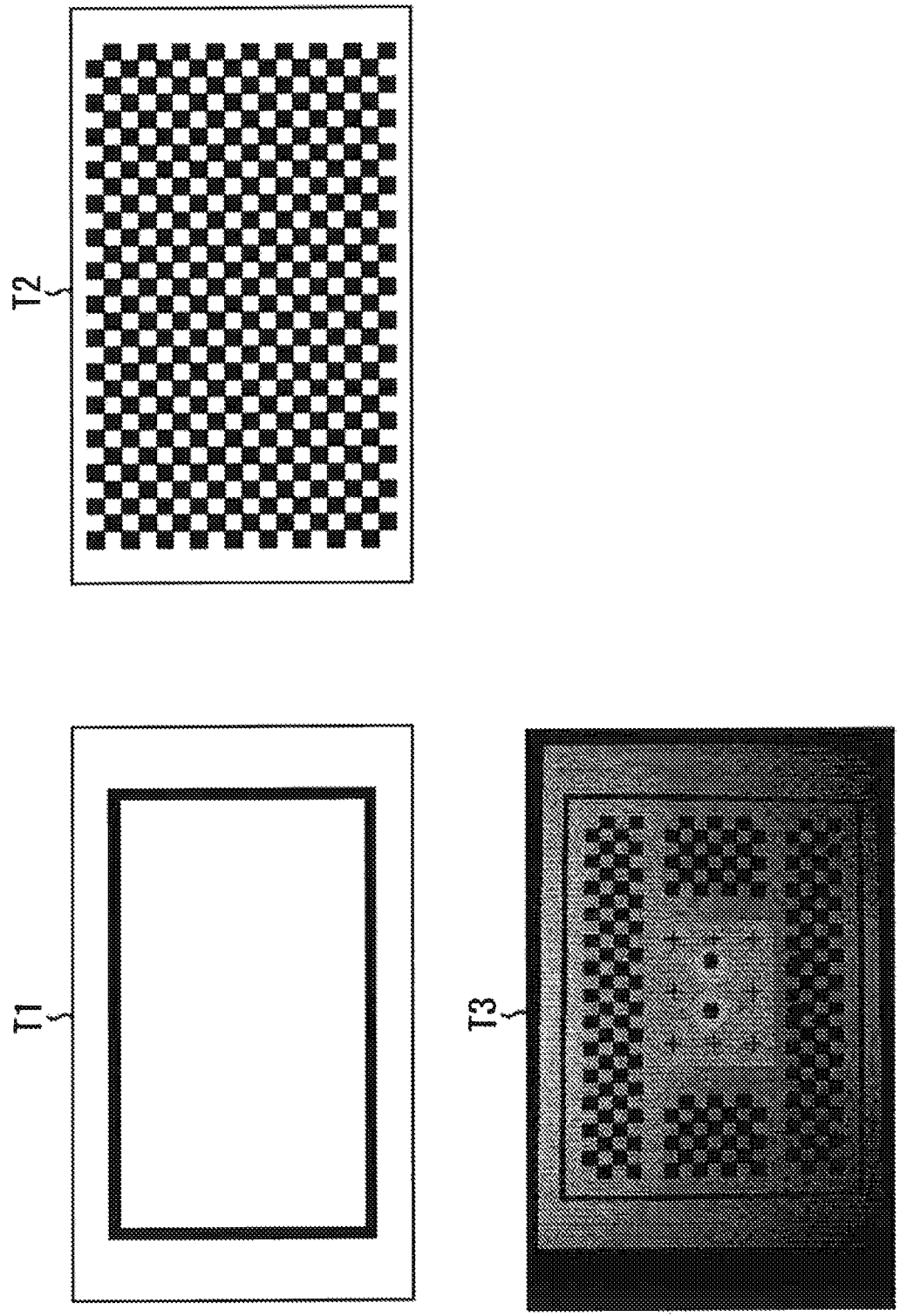
FIG. 3 is a diagram to describe a pattern of the chart pattern of FIG. 1.

For example, the chart pattern 13 may be pattern T1 which is called "box chart" illustrated in FIG. 3, pattern T2 which is called "lattice point chart" or pattern T3 combining the box chart and the lattice point chart. Here, pattern T3 is similar to the chart pattern represented by image P in FIG. 2.

The depth detection unit 14 acquires the images photographed by the stereo camera 11 and acquires the correction parameter which is calculated by the calibration processing and supplied from the stereo camera 11. Subsequently, the depth detection unit 14 corrects the images supplied from the stereo camera 11 by the use of the correction parameter, and calculates the distance in a pixel unit on the basis of the corrected images and detects a depth image (or disparity image).

<Function to Realize Each Component of Image Processing System>

Figure 4:
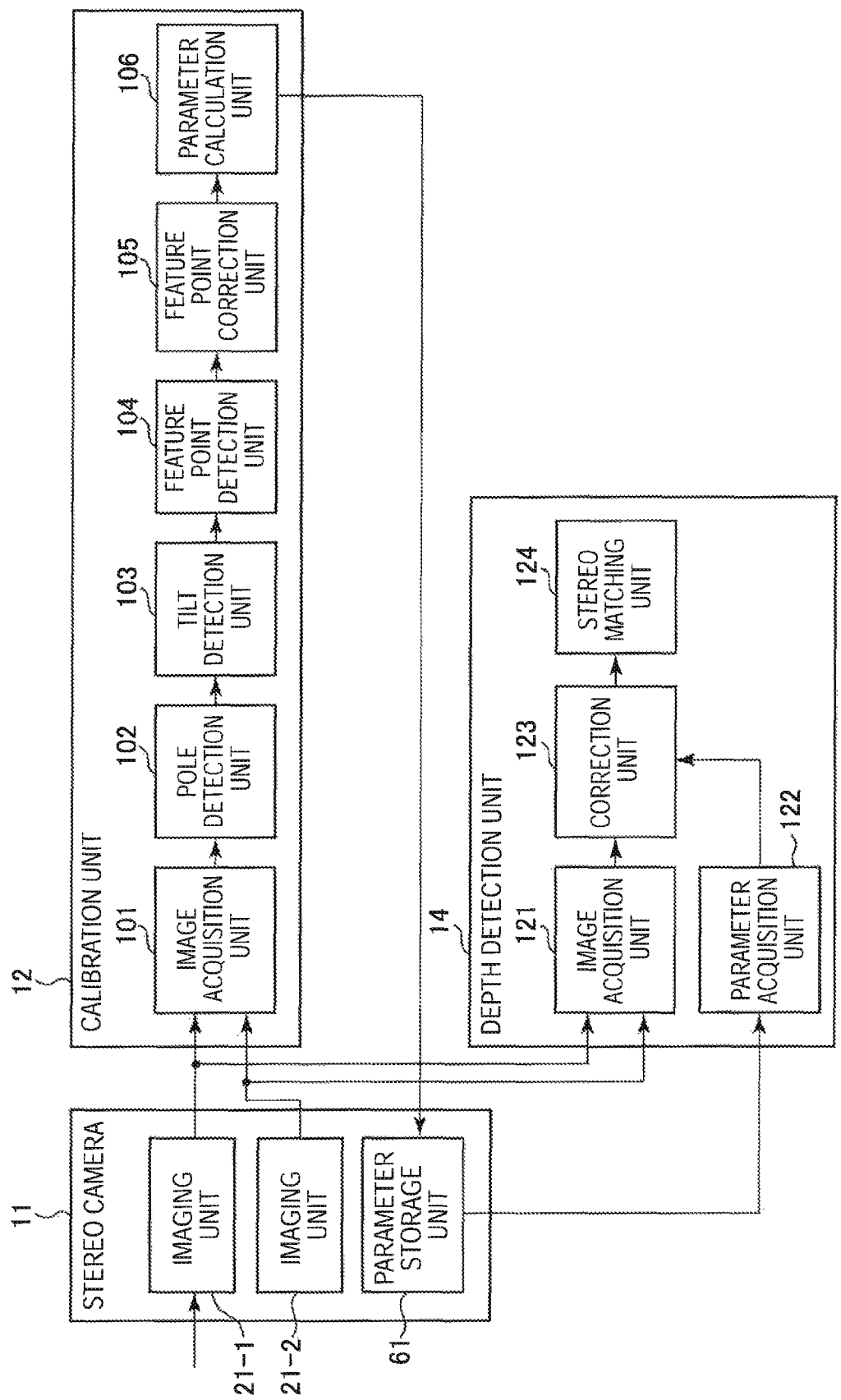
FIG. 4 is a functional block diagram to describe a function to realize the image processing system in FIG. 1.

Next, a function to realize each component of the image processing system in FIG. 1 is described with reference to the functional block diagram in FIG. 4.

The stereo camera 11 includes the imaging units 21-1 and 21-2 and a parameter storage unit 61. The imaging units 21-1 and 21-2 include imaging elements such as a CCD (Charge Coupled Device) and a CMOS (Complementary Metal Oxide Semiconductor). The imaging units 21-1 and 21-2 are arranged with an interval of a predetermined distance in the horizontal direction, photograph the chart pattern 13 that is an image in the same direction with respect to a baseline formed with the straight line connecting the installation positions of the imaging units 21-1 and 21-2, and supply the photographed image to the calibration unit 12 at the time of the calibration processing. Moreover, in the depth detection processing, the imaging units 21-1 and 21-2 supply the photographed images to the depth detection unit 14. Here, in a case where the imaging units 21-1 and 21-2 are not specifically distinguished from each other, they may be simply referred to as "imaging unit 21" and the same applies to other components.

The parameter storage unit 61 stores the correction parameter calculated by the calibration processing in the calibration unit 12 and supplies the stored correction parameter to the depth detection unit 14 in the depth detection processing.

The calibration unit 12 includes an image acquisition unit 101, a pole detection unit 102, a tilt detection unit 103, a feature point detection unit 104, a feature point correction unit 105 and a parameter calculation unit 106.

The image acquisition unit 101 acquires two images of the chart pattern, which are photographed by the imaging units 21-1 and 21-2 of the stereo camera 11, and supplies the two photographed images of the chart pattern to the pole detection unit 102.

The pole detection unit 102 detects the position of the pole 41 on the basis of the two images of the chart pattern and supplies the two photographed images to the tilt detection unit 103 together with information on the position of the detected pole 41.

The tilt detection unit 103 detects the tilt of the chart pattern 13 on the basis of the information on the detected position of the pole 41 and supplies the two photographed images to the feature point detection unit 104 together with information on the detected tilt of the chart pattern 13.

The feature point detection unit 104 detects feature points of sub-pixels from the two photographed images and supplies the detection result and the photographed images to the feature point correction unit 105.

The feature point correction unit 105 corrects the feature points on the basis of the detection result of the feature points and supplies the correction result and the photographed images to the parameter calculation unit 106.

The parameter calculation unit 106 calculates a correction parameter from correction images as the correction result and the photographed images, and stores it in the parameter storage unit 61 of the stereo camera 11.

The depth detection unit 14 includes an image acquisition unit 121, a parameter acquisition unit 122, a correction unit 123 and a stereo matching unit 124. The image acquisition unit 121 acquires the two images photographed by the imaging units 21-1 and 21-2 of the stereo camera 11 in the depth detection processing and supplies them to the correction unit 123.

The parameter acquisition unit 122 reads and acquires the correction parameter stored in the parameter storage unit 61 of the stereo camera 11 and supplies it to the correction unit 123.

The correction unit 123 corrects the two images which are acquired by the image acquisition unit 121 and photographed by the imaging units 21-1 and 21-2, by the use of the correction parameter, and supplies the correction images to the stereo matching unit 124.

The stereo matching unit 124 calculates the distance in a pixel unit from the two images corrected by the stereo matching processing and generates and outputs a depth image (or disparity image).

<Calibration Processing>

Next, the calibration processing is described with reference to the flowchart in FIG. 5.

In step S11, the stereo camera 11 photographs a stereo image formed with two images by the use of the imaging units 21-1 and 21-2, and supplies it to the calibration unit 12. At this time, the image acquisition unit 101 of the calibration unit 12 supplies the two acquired images to the pole detection unit 102.

In step S12, the pole detection unit 102 performs pole detection processing, detects the poles 41-1 and 41-2 by the photographed images and supplies the detection result and the photographed images to the tilt detection unit 103.

<Pole Detection Processing>

Figure 6:
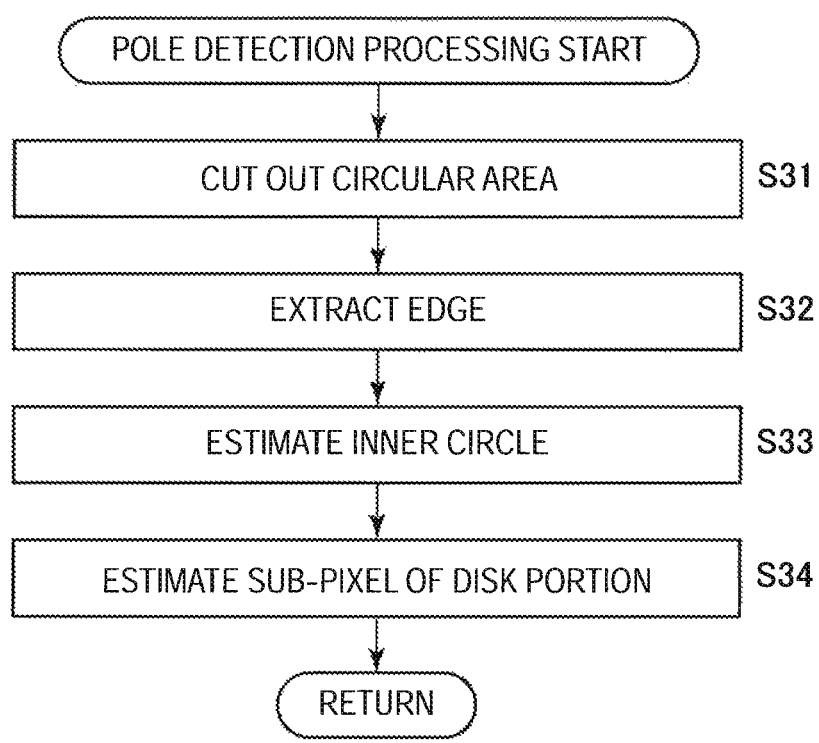
FIG. 6 is a flowchart to describe pole detection processing.

Here, the pole detection processing is described with reference to the flowchart in FIG. 6.

In step S31, the pole detection unit 102 cuts out and extracts circular areas from the photographed image. That is, for example, in a case where the photographed image is image P1 illustrated in the upper left part of FIG. 7, the pole detection unit 102 detects circular portions C1 and C2, and cuts out and extracts image P2 formed with circular areas including circular portions C1 and C2, as illustrated in the upper right part of FIG. 7.

In step S32, the pole detection unit 102 applies predetermined filter processing such as the Laplacian filter to image P2 formed with the extracted circular areas, and, for example, extracts edge image P3 as illustrated in the lower left part of FIG. 7.

In step S33, the pole detection unit 102 estimates inner circles of circular portions C1 and C2 from edge image P3. That is, the pole detection unit 102 estimates inner circles IL and IR in the lower right part of FIG. 7 as the inner circles of circular portions C1 and C2.

In step S34, the pole detection unit 102 estimates the disk portions 41a-1 and 41a-2 from the images of inner circles IL and LR in the sub-pixel order.

By the above processing, the pole detection unit 102 estimates inner circles IL and IR of circular portions C1 and C2 in the photographed image, detects the disk portions 41a-1 and 41a-2 that are the tips of the poles 41-1 and 41-2 in inner circles IL and IR in the sub-pixel order, and supplies the photographed image to the tilt detection unit 103 together with information on the detected disk portions 41a-1 and 41a-2 of sub-pixel units. Here, regarding estimation of inner circles IL and IR, they may be estimated by other methods, and, for example, they may be estimated by the Hough transform.

Figure 5:
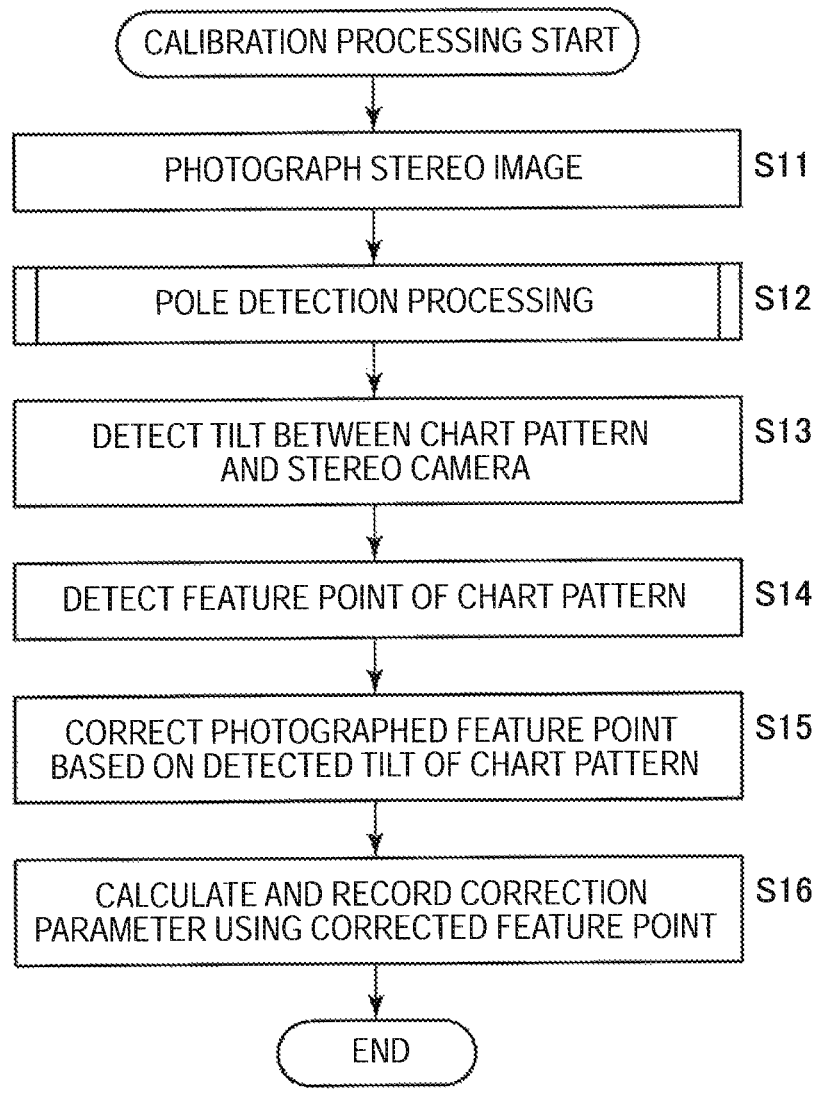
FIG. 5 is a flowchart to describe calibration processing.

Here, it returns to the explanation of the flowchart in FIG. 5.

In step S13, the tilt detection unit 103 detects the tilt between the chart pattern 13 and the stereo camera 11, and is supplies it to the feature point detection unit 104 together with the photographed image.

Here, the tilt between the chart pattern 13 and the stereo camera 11 may be a model in which the stereo camera 11 rotates with respect to the chart pattern 13 and a model in which the chart pattern 13 rotates with respect to the stereo camera 11.

Figure 8:
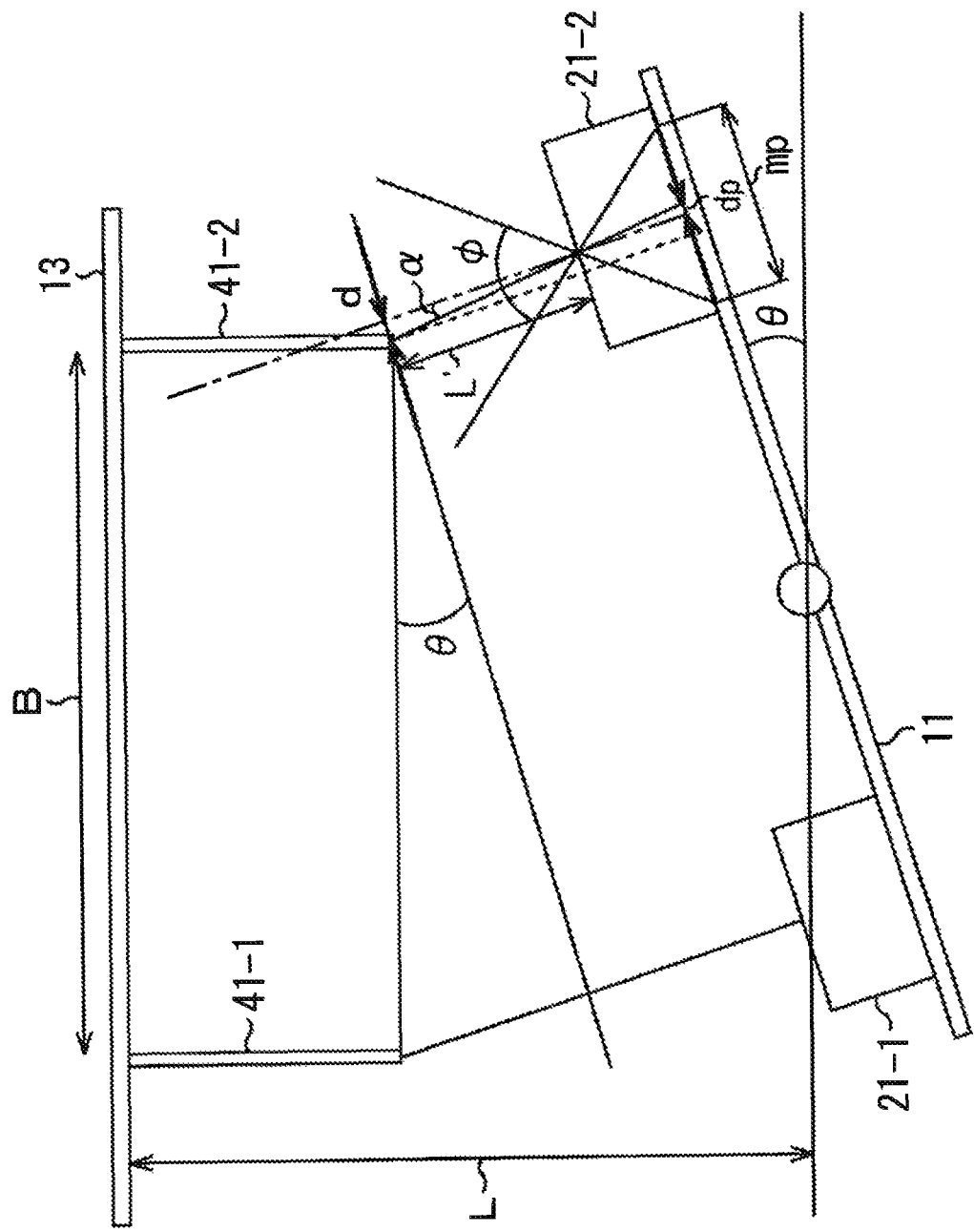
FIG. 8 is a diagram to describe a model in a case where a stereo camera is inclined.

For example, in the case of considering the model in which the stereo camera 11 rotates with respect to the chart pattern 13, the model is as illustrated in FIG. 8, and, from the relationship based on this model, the relationships in following Equations (1) to (4) are found.

$$d = B(1 - \cos\theta) \quad (1)$$

$$2L'\tan\frac{\phi}{2} : L'\tan\alpha = \frac{m_p}{2} : d_p \quad (2)$$

$$L'\tan\alpha = d \quad (3)$$

$$d_p = \frac{m_p B(1 - \cos\theta)}{2L'\tan\frac{\phi}{2}} \quad (4)$$

Here, "d" shows the shift amount of the detection position of the tip of pole 41-2, which is caused according to the rotation of the stereo camera 11 with respect to baseline B only by θ, "B" shows the distance on baseline B which is the axis between the poles 41-1 and 41-2, and "θ" shows the rotation angle formed with respect to baseline B between the imaging units 21-1 and 21-2 of the stereo cameras 11. Moreover, "L" shows the distance between the imaging unit 21-2 when the stereo camera 11 rotates and the tip of the pole 41, "φ" shows the angle of view in the imaging unit 21-2, "mp" shows the number of pixels in the horizontal direction of the imaging unit 21-2 and "dp" shows the shift amount in the pole tip on the image. Moreover, "α" shows the angle formed between the pole tip and the shifted pole tip. Also, in FIG. 8, the disk portion 41a is not installed in the tip of the pole 41 for simplification, and it is not the T-shaped pole 4 but as the rod-shaped pole 41 in the side view. However, an explanation is given with an assumption that the tip of the pole 41 is the disk portion 41a. That is, since the disk portion 41a of the pole 41 is installed such that the tip of the pole 41 is likely to be recognized as an image, the shape of the pole 41 in the side direction may be either T-shaped or I-shaped. Therefore, in the following, an explanation is given with an assumption that the tip of the pole 41 is the disk portion 41a.

In view of the above configuration, for example, in a case where horizontal pixel number mp is 1280 pixels, the interval between the poles 41-1 and 41-2 on baseline B is 8 cm, distance L' is 70 cm and angular field φ is 72.5 degrees, if rotation angle θ is 1 degree, shift amount dp becomes 0.0152 pixels.

That is, it is demanded to find the position of the tip of the pole 41 at accuracy of 0.0152 pixels to provide the limitation accuracy of 1 degree between the chart pattern 13 and the stereo camera 11.

Figure 9:
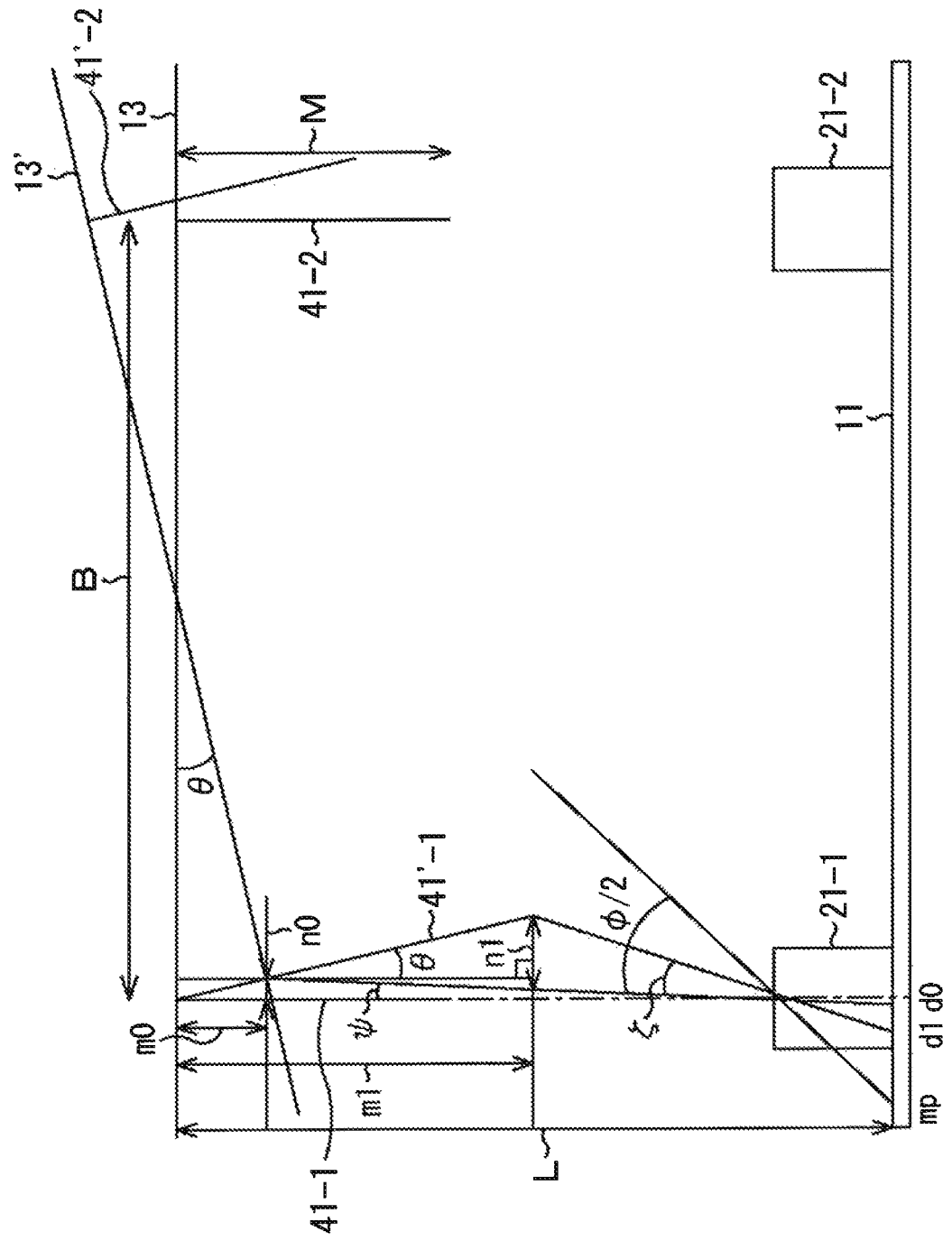
FIG. 9 is a diagram to describe a model in a case where a chart pattern is inclined.

Moreover, in a case where the chart pattern 13 rotates with respect to the stereo camera 11, it is as illustrated in the model in FIG. 9, and, from the relationship based on this model, the relationships in following Equations (5) to (14) are found.

$$n_0 = \frac{B}{2}(1 - \cos\theta) \quad (5)$$

$$m_0 = \frac{B}{2}\sin\theta \quad (6)$$

$$n_1 = n_0 + M\sin\theta = \frac{B}{2}(1 - \cos\theta) + M\sin\theta \quad (7)$$

$$m_1 = m_0 + M\cos\theta = \frac{B}{2}\sin\theta + M\cos\theta \quad (8)$$

$$(L - m_1)\tan\zeta = n_1 \quad (9)$$

$$2(L - m_1)\tan\frac{\phi}{2} : (L - m_1)\tan\zeta = m_p : d_1 \quad (10)$$

$$(L - m_0)\tan\psi = n_0 \quad (11)$$

$$2(L - m_0)\tan\frac{\phi}{2} : (L - m_0)\tan\zeta = m_p : d_0 \quad (12)$$

$$d_1 = m_p \frac{\frac{B}{2}(1 - \cos\theta) + M\sin\theta}{2\left\{L - \left(\frac{B}{2}\sin\theta + M\cos\theta\right)\right\}\tan\frac{\phi}{2}} \quad (13)$$

$$d_0 = m_p \frac{\frac{B}{2}(1 - \cos\theta)}{2\left(L - \frac{B}{2}\sin\theta\right)\tan\frac{\phi}{2}} \quad (14)$$

Here, "n0" shows the shift amount in the horizontal direction (i.e., direction of baseline B) of the root positions of the poles 41 and 41', which is caused by rotation of the chart pattern 13', "B" shows the distance between the poles 41-1 and 41-2 on baseline B, "θ" shows the rotation angle of the chart pattern 13 and "m0" shows the shift amount in the vertical direction at the root positions of the poles 41 and 41'. Moreover, "n1" shows the shift amount between the tips of the poles 41 and 41' in the horizontal direction, "M" shows the length of the pole 41 and "m1" shows the distance between the tip of the shifted pole 41' and baseline B in the vertical direction. Further, "L" shows the distance between baseline B of the chart pattern 13 that does not rotate and the stereo camera 11, "ξ" shows the angle formed between the root position and tip of the shifted pole 41' in the central position of the imaging unit 21-1, and "φ" shows the angle of view in the imaging unit 21-1. Moreover, "mp" shows the number of pixels from the edge in the horizontal direction of the image photographed by the imaging unit 21-1 to the central pixel, and "d1" shows the number of pixels from the horizontal central pixel to a pixel indicating the tip of the pole 41' in the image photographed by imaging unit 21-1. Further, "d0" shows the number of pixels from the horizontal central pixel to a pixel indicating the root of the pole 41 in the image photographed by the imaging unit 21-1, and "ψ" shows the gap angle between the root positions of the poles 41 and 41' in the image photographed by the imaging unit 21-1.

As a result, in a case where horizontal pixel number mp is 1280 pixels, the interval between the poles 41-1 and 41-2 in baseline B is 8 cm, distance L' is 70 cm, angular field φ is 72.5 degrees and length M of the pole 41 is 7 cm, d0(1) becomes 0.0076041 if there is a gap of 1 degree in d0, and d0(2) becomes 0.0304445 if there is a gap of 2 degrees. Moreover, in the same conditions, if there is a gap of 1 degree in d1, d1(1) becomes 1.702891 and d1(2) becomes 3.257879.

Figure 10:
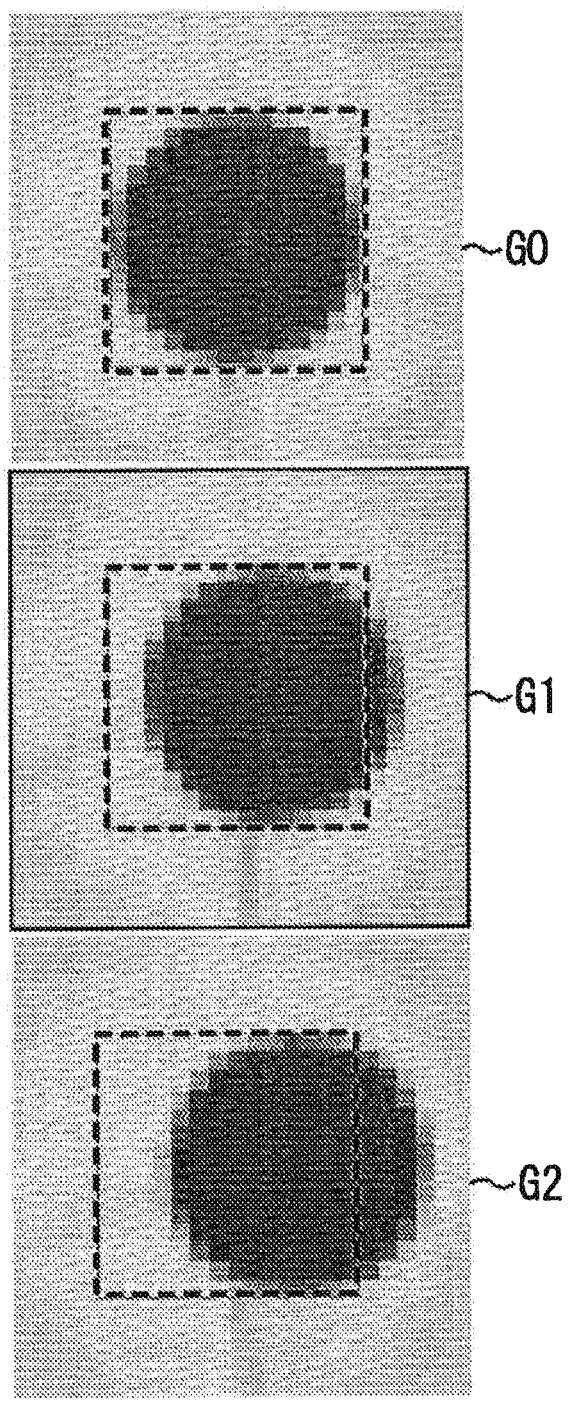
FIG. 10 is a diagram to describe a gap of the front edge of a pole.

Here, in a case where the chart pattern 13 does not rotate with respect to the stereo camera 11, it is assumed that the disk portion 41a that is the tip of the pole 41 is included in the square illustrated by the dotted line as illustrated by image G0 in the upper part of FIG. 10. Under this condition, in a case where the chart pattern 13 rotates with respect to the stereo camera 11 such that θ equals to 1 degree, the disk portion 41a that is the tip of the pole 41 is photographed as illustrated by image G1 in the medium part of FIG. 10. Further, in a case where the chart pattern 13 rotates with respect to the stereo camera 11 such that θ equals to 2 degrees, the disk portion 41a that is the tip of the pole 41 is photographed as illustrated by image G2 in the lower part of FIG. 10. That is, at the time of θ=1, the disk portion 41a of the pole 41 is horizontally shifted only by 1.7 pixels from the square illustrated by the solid line. Similarly, at the time of θ=2, it can be confirmed that the disk portion 41a of pole 41 is horizontally shifted only by 3.4 pixels from the square illustrated by the solid line. Here, FIG. 10 illustrates an example of photographed images of the disk portion 41a in the case of the same as the above-mentioned conditions, and what is imaged in a mosaic manner shows the pixel size.

As described above, in step S13, the tilt detection unit 103 calculates the gap angle of rotation with respect to the imaging direction of the imaging units 21-1 and 21-2, according to the number of pixels by which images of the disk portions 41a-1 and 41a-2 that are the tips of the poles 41-1 and 41-2 shift from the square illustrated by the dotted line as illustrated in FIG. 10. Here, as described above, when calculating the gap angle, either an equation defined by a model in which the stereo camera 11 rotates with respect to the chart pattern 12 or an equation defined by a model in which the chart pattern 12 rotates with respect to the stereo camera 11 may be used. Moreover, although each model has been described only for association with the image photographed by the imaging unit 21-2 in FIG. 8 and only for association with the image photographed by the imaging unit 21-1 in FIG. 9, it is demanded to measure the similar relationships with respect to both of the imaging units 21-1 and 21-2 in each model and detect the tilt.

In the above, although an example case has been described where a rotation angel is calculated as a tilt when the direction which is vertical to baseline B between the poles 41-1 and 41-2 in the chart pattern 13 and which is vertical to the imaging directions of the imaging units 21-1 and 21-2 is as an axis, in the similar method, the tilt detection unit 103 also calculates a rotation angle when baseline B is as an axis. Further, the tilt detection unit 103 also calculates a rotation angle indicating a tilt of rotation of the stereo camera 11 or the chart pattern 13 with respect to the imaging direction of the imaging unit 21 as an axis. At this time, the tilt detection unit 103 calculates the rotation angle with respect to the imaging direction as the axis by calculating an angle formed between the horizontal direction and the straight line connecting the central parts of the disk portions 41a-1 and 41a-2 of the poles 41-1 and 41-2 in the images photographed by the imaging units 21-1 and 21-2.

That is, the tilt detection unit 103 calculates three kinds of rotation angles including: a rotation angle (i.e., the first rotation angle) when the direction which is vertical to baseline B and which is vertical to the imaging direction of the imaging unit 21 is an axis; a rotation angle (i.e., the second rotation angle) when baseline B is used as the axis; and a rotation angle (i.e., the third rotation angle) when the imaging direction of the imaging unit 21 is an axis.

Here, it returns to the explanation of the flowchart in FIG. 5.

In step S14, the feature point detection unit 104 extracts the corner part or intersection part in the chart pattern as a feature point demanded for calibration processing on the basis of the photographed images, and supplies the extracted feature point information, tilt information and information on the photographed image to the feature point correction unit 105

For example, in a case where the box chart is used, first, the feature point detection unit 104 detects edges which are lines surrounding the box chart. To be more specific, with an assumption that the brightness value of the images photographed by the imaging units 21-1 and 21-2 is g(x, y) and the brightness value of corrected images is f(x, y), the feature point detection unit 104 performs calculation according to following Equations (15) to (17) and detects the edges in the horizontal direction and the vertical direction.

$$f(x, y) = \sum_{j=0,1,2} \sum_{i=0,1,2} \{g(x+i-1, y+j-1) \cdot h(i, j)\} \quad (15)$$

In case of vertical edge, $$h = \begin{pmatrix} -1 & 0 & +1 \\ -1 & 0 & +1 \\ -1 & 0 & +1 \end{pmatrix} \quad (16)$$

In case of horizontal edge, $$h = \begin{pmatrix} -1 & -1 & -1 \\ 0 & 0 & 0 \\ +1 & +1 & +1 \end{pmatrix} \quad (17)$$

Next, the feature point detection unit 104 finds a part in which the detected edges are consecutive, and extracts the coordinate rows of edges corresponding to four upper, lower, right and left straight lines in total. These coordinate rows are used to calculate the linear equation indicating four straight lines by the use of the least square method or the like.

That is, for example, when images PL1 and PR1 as illustrated in FIG. 11 are photographed by the stereo camera 11, the feature point detection unit 104 approximates two upper and lower straight lines to a linear equation like y=ax+b and approximates two right and left straight lines to a linear equation like x=cx+d.

Subsequently, by solving this linear equation, the feature point detection unit 104 detects right and left chart pattern reference points p0 to p3 as feature points, as illustrated by images PL1' and PR1' in FIG. 12.

In step S15, the feature point correction unit 105 corrects information on the feature points calculated as chart pattern reference points on the basis of the tilt information, and supplies information on the feature points before correction, information on the corrected feature points and information on the photographed images to the parameter calculation unit 106.

That is, for example, the feature point correction unit 105 corrects feature point (x, y, z) to corrected feature point (x', y', z') by calculating following Equations (18) to (20), $$x' = x \cdot \left((1 - \sin\phi) \cdot \tan\left(\frac{\theta}{2}\right)\right) \cdot \cos\alpha \quad (18)$$

$$y' = y \cdot \left((1 - \sin\theta) \cdot \tan\left(\frac{\phi}{2}\right)\right) \cdot (1 - \sin\alpha) \quad (19)$$

$$z' = z - x \cdot \sin\theta - y \cdot \sin\phi \quad (20)$$

Figure 13:
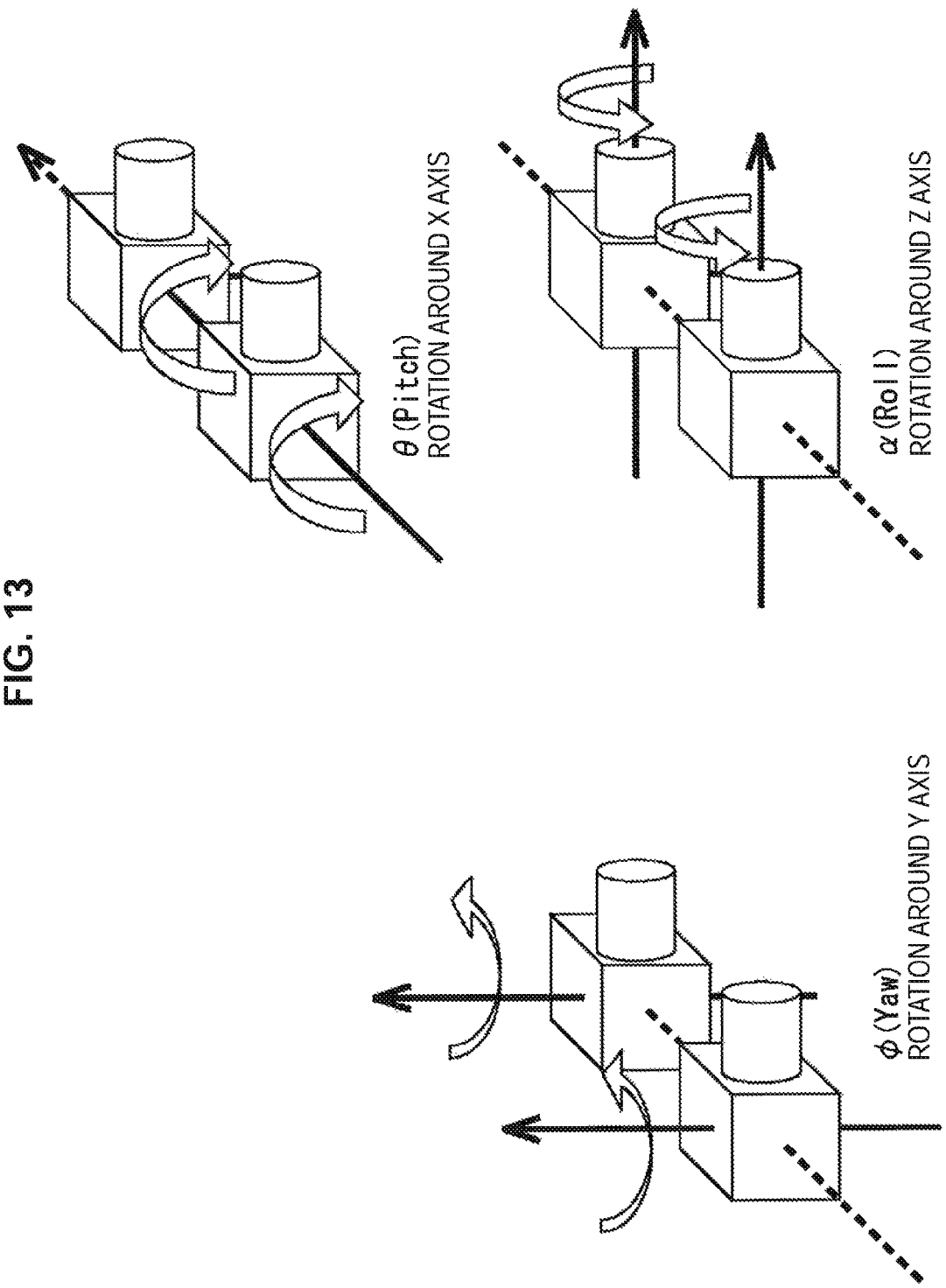
FIG. 13 is a diagram to describe a parameter definition.

Here, "θ," "φ" and "α" represent rotations (pitch) around the X axis, rotation (Roll) around the Z axis and rotation (Yaw) around the Y axis in FIG. 13, respectively. That is, θ corresponds to the rotation angle (i.e., the second rotation angle) calculated by the tilt detection unit 103 when baseline B is an axis, φ corresponds to the rotation angle (i.e., the first rotation angle) when the direction which is vertical to baseline B and which is vertical to the imaging direction of the imaging unit 21 is an axis, and "α" corresponds to rotation angle (i.e., the third rotation angle) when the imaging direction of the imaging unit 21 is an axis.

In step S16, the parameter calculation unit 106 calculates a correction parameter from information on feature point (x, y, z) and corrected feature point (x', y', z'), and stores the calculated correction parameter in the parameter storage unit 61 of the stereo camera 11.

To be more specific, in a case where the box chart is used as a chart pattern, the parameter calculation unit 106 calculates correction parameters to perform transformation from images PL1 and PR1 to intended right and left correction images by the use of four coordinates of feature points p0 to p3. Specific processing content is described below. Here, the processing for transformation to the intended right and left correction images denotes processing to make the shapes of the chart patterns displayed in corrected images PL11 and PR11 identical as illustrated in FIG. 14.

The parameter calculation unit 106 calculates correction parameters to acquire such correction images PL11 and PR11, that is, a correction parameter to transform the photographed images PL1 and PR1 of the imaging units 214 and 21-2 illustrated in FIG. 11 into intended correction images PL11 and PR11 by projective transformation.

To be more specific, first, the parameter calculation unit 106 calculates tilt angle φ after correction and the lengths (w, h) of horizontal and vertical sides of a reference rectangle to project a quadrangle that is formed by connecting four points of feature points p0 to p3 acquired from the images which are photographed by the imaging units 21-1 and 21-2 and which are right and left camera images, to a rectangle of the same shape.

Figure 15:
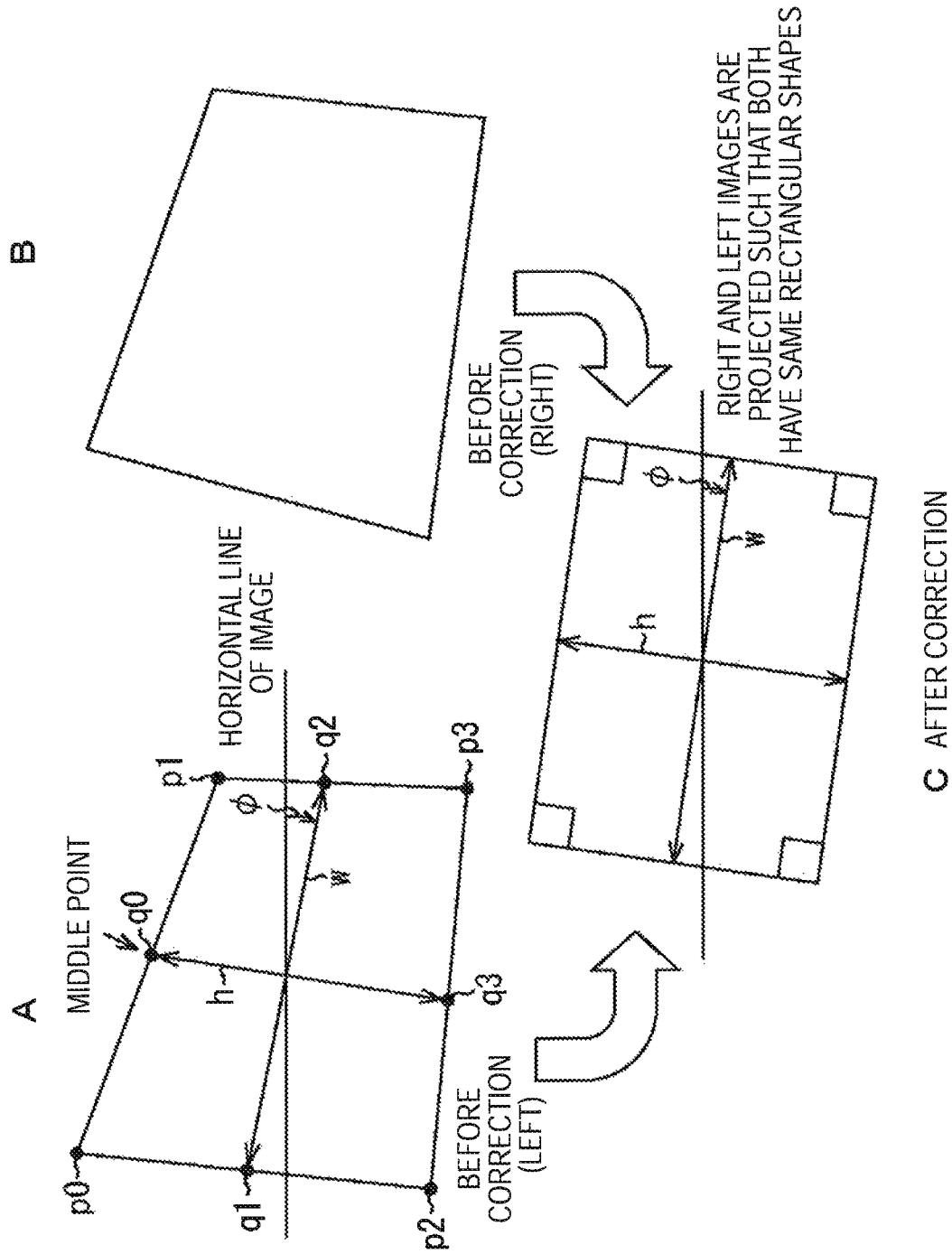
FIG. 15 is a diagram to describe a setting processing example of a reference rectangle by image correction performed at the time of generating a correction parameter.

Next, the parameter calculation unit 106 acquires q0, q1, q2 and q3, which are the middle point between chart reference points p0 and p1, the middle point between chart reference points p2 and p3, the middle point between chart reference points p0 and p2 and the middle point between chart reference points p1 and p3, respectively, in an image photographed by one of the imaging units 21-1 and 21-2 (here, the image photographed by the imaging unit 21 installed on the left side) as illustrated in FIG. 15A.

Here, it is assumed that the length of a straight line connecting chart reference points q1 and q2 is w, the length of a straight line connecting chart reference points q0 and q3 is h, and, furthermore, the tilt to a camera image horizontal line of a straight line connecting chart reference points q1 and q2 is m.

Furthermore, the rectangle illustrated in FIG. 15C is a rectangle formed by sides of lengths h and w, and this rectangle is assumed to be a reference rectangle.

Figure 16:
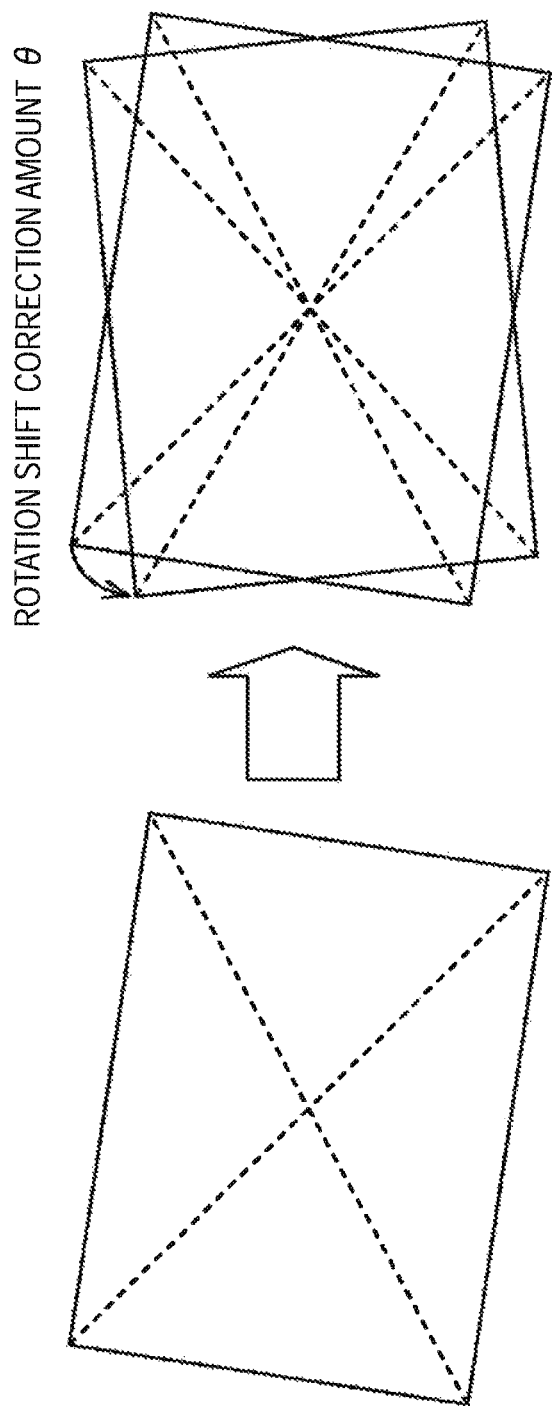
FIG. 16 is a diagram to describe rotation processing based on a correction parameter.
Figure 17:
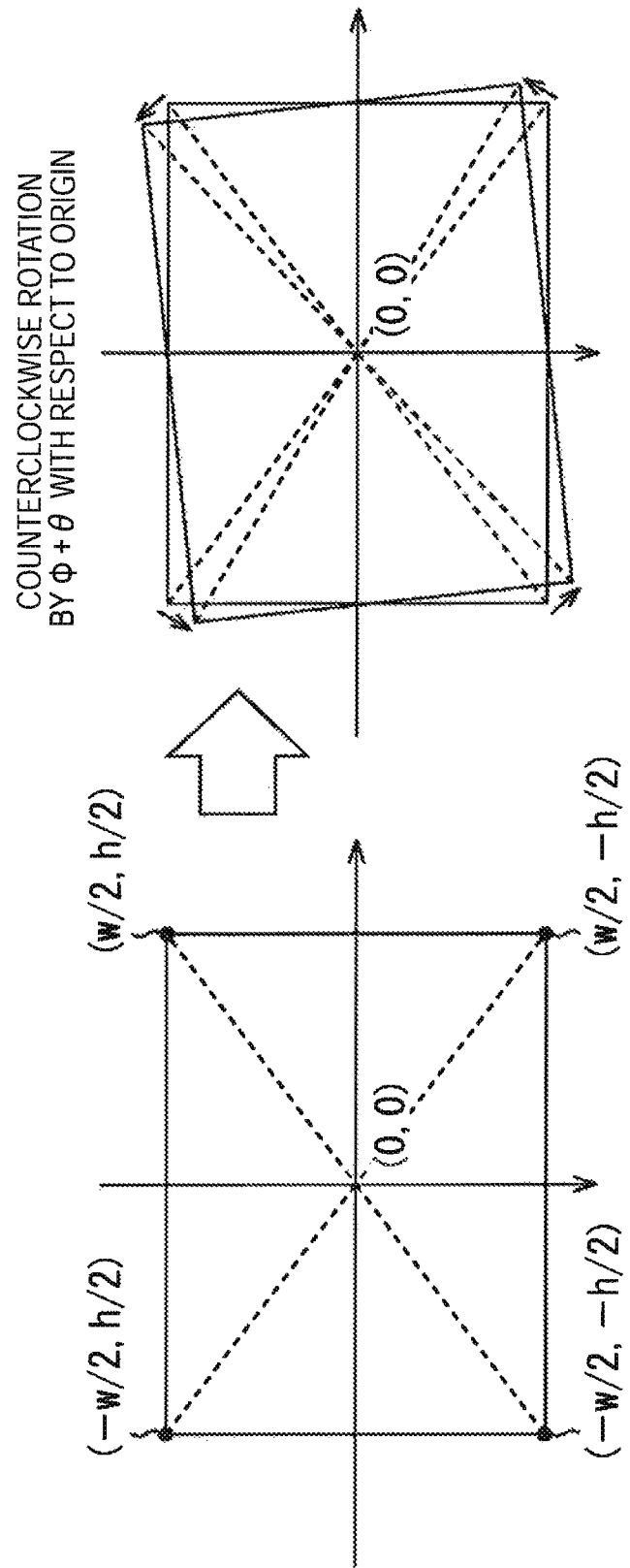
FIG. 17 is a diagram to describe processing performed at the time of generating a correction parameter.

Moreover, as illustrated in FIG. 16, the reference rectangle (FIG. 15C) calculated as above is rotated only by rotation correction amount θ (e.g., θ=−0.15 [rad] as the initial value). This shows that, as illustrated in FIG. 17, a rectangle with (−w/2, h/2), (w/2, h/2), (−w/2, −h/2) and (w/2, −h/2) as vertexes may balance itself on origin (0, 0) and be rotated by φ+θ.

Figure 18:
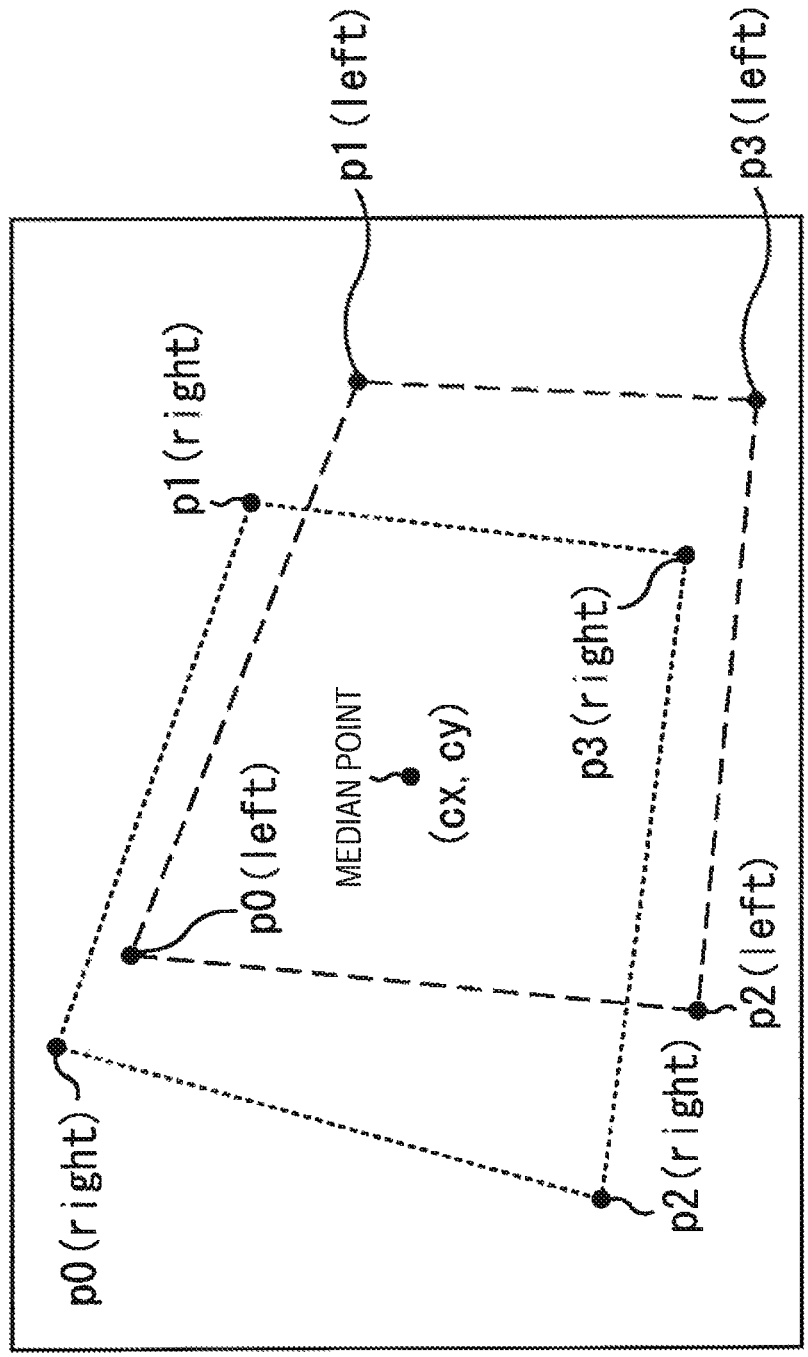
FIG. 18 is a diagram to describe processing performed at the time of generating a correction parameter.

Next, it is assumed that the parameter calculation unit 106 calculates the median points of two quadrangles formed by connecting reference point p0 to p3 of the box charts detected from the images photographed by the imaging units 21-1 and 21-2 as illustrated in FIG. 18, and further calculates the middle point as (cx, cy). The reference rectangle (in which the median point is the origin) calculated as above is subjected to parallel translation such that this (cx, cy) becomes the median point (see FIG. 19).

When this transformation processing is expressed by an equation, since it corresponds to processing of parallel translation by (cx, cy) after rotation by (φ+θ) by the affine transformation, final coordinates (X, Y) of the reference rectangle are as illustrated in following Equation (21).

$$\begin{pmatrix} X \\ Y \end{pmatrix} = \begin{pmatrix} x \\ y \end{pmatrix} \begin{pmatrix} \cos(\phi + \theta) & -\sin(\phi + \theta) \\ \sin(\phi + \theta) & \cos(\phi + \theta) \end{pmatrix} + \begin{pmatrix} cx \\ cy \end{pmatrix} \quad (21)$$

Figure 19:
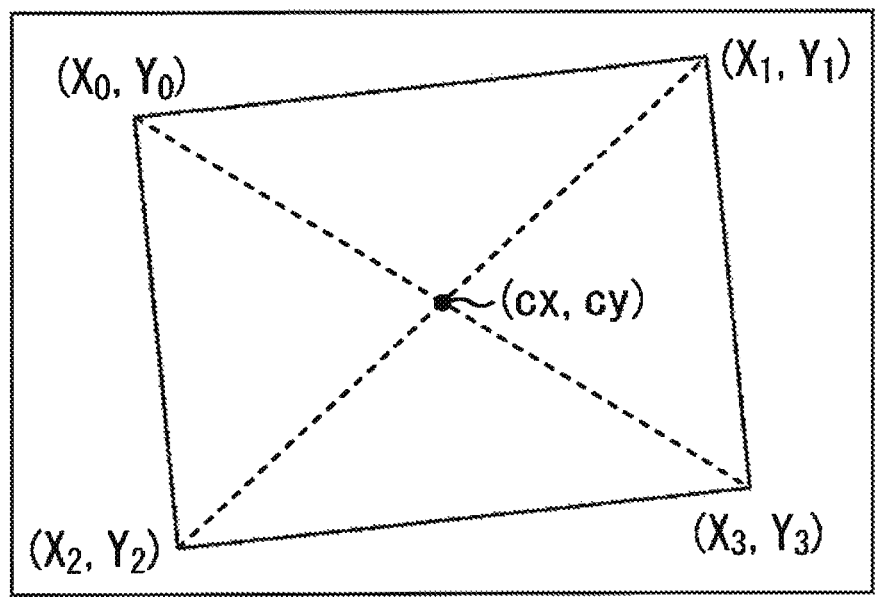
FIG. 19 is a diagram to describe processing performed at the time of generating a correction parameter.

In above Equation (21), absolute coordinates (X0, Y0), (X1, Y1), (X2, Y2) and (X3, Y3) showing the vertexes of the reference rectangle as illustrated in FIG. 19 are calculated by substituting, in (x, y), coordinates (−w/2, h/2), (w/2, h/2), (−w/2, −h/2), (w/2, −h/2), and so on, of the vertexes of the reference rectangle in which the median point is the origin.

Figure 20:
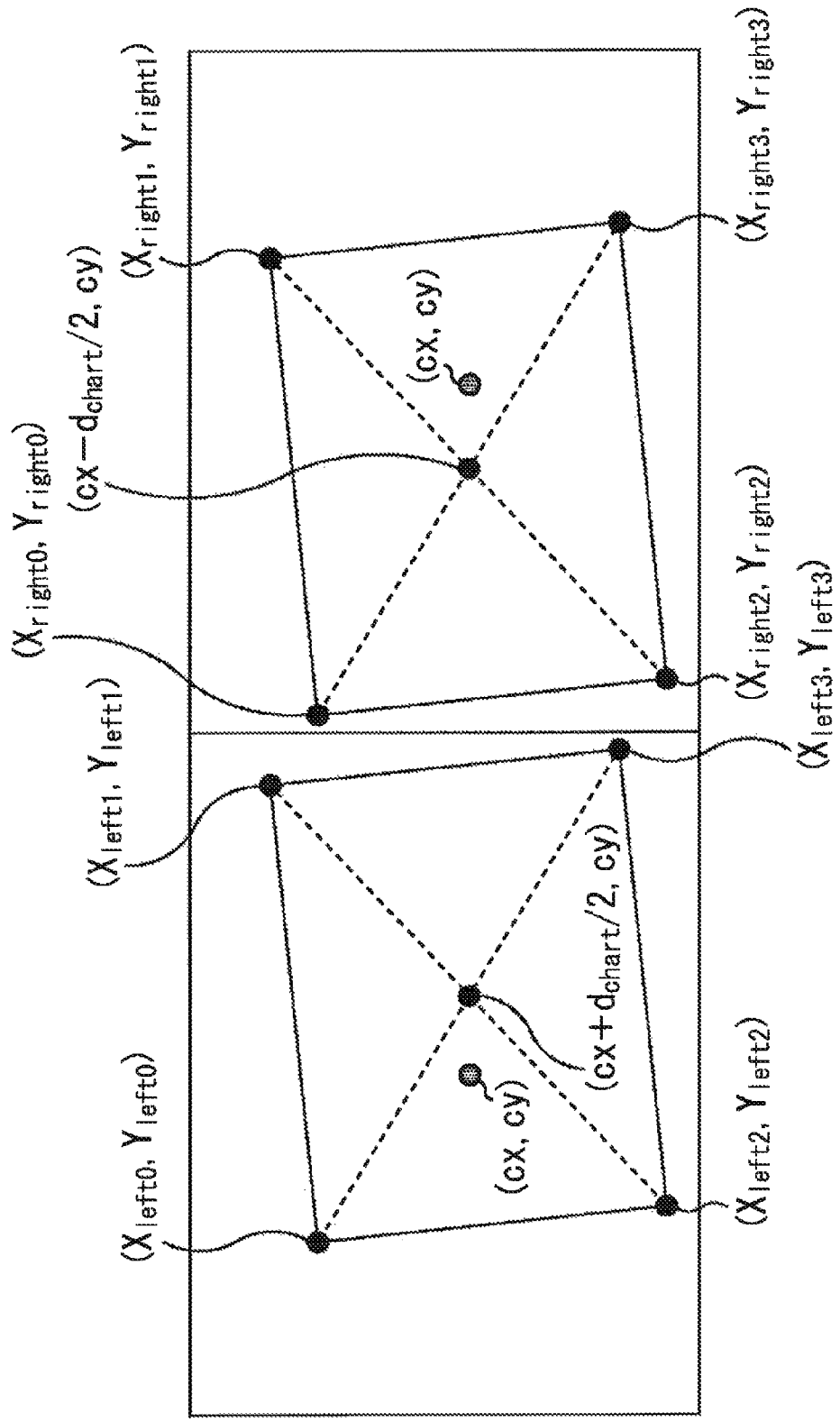
FIG. 20 is a diagram to describe processing performed at the time of generating a correction parameter.

Finally, as illustrated in FIG. 20, the parameter calculation unit 106 calculates vertex coordinates (Xleft0, Yleft0) to (Xleft3, Yleft3) of the reference rectangle in the left correction image illustrated in the left part of the figure, and vertex coordinates (Xright0, Yright0) to (Xright3, Yright3) of the reference rectangle in the right correction image illustrated in the right part of the figure.

This shows that the reference rectangle may be subjected to parallel translation in the horizontal direction such that the disparity in the object of the infinite distance may be eliminated (i.e., the horizontal coordinates are matched) between the right and left correction images. That is, the reference rectangle may be subjected to parallel translation by right and left disparity dchart corresponding to the distance from the stereo camera 11 to the chart pattern 13. A specific procedure is shown as follows.

That is, when it is assumed that length (or distance between chart reference points p0 and p1 or between chart reference point p2 and p3) Wchart in the horizontal direction of the rectangular pattern of the chart in actual space and base length Wbaseline of the right and left cameras are already known, it is possible to calculate parallax dchart by the use of length w in the horizontal direction of the rectangular pattern acquired from the images photographed by the imaging units 21-1 and 21-2, according to following Equation (22).

$$d_{chart} = w \frac{W_{baseline}}{W_{chart}} \quad (22)$$

Therefore, coordinates ((Xleft0, Yleft0) to (Xleft3, Yleft3) and (Xright0, Yright0) to (Xright3, Yright3) of the reference rectangles taking into account the right and left disparity are subjected to parallel translation by the disparity calculated above, such that coordinates (X, Y) calculated above become equal between the left image and the right image, which can be expressed as following Equations (23) and Equation (24).

$$\begin{pmatrix} X_{left} \\ Y_{left} \end{pmatrix} = \begin{pmatrix} X \\ Y \end{pmatrix} + \begin{pmatrix} \frac{d_{chart}}{2} \\ 0 \end{pmatrix} \quad (23)$$

$$\begin{pmatrix} X_{right} \\ Y_{right} \end{pmatrix} = \begin{pmatrix} X \\ Y \end{pmatrix} - \begin{pmatrix} \frac{d_{chart}}{2} \\ 0 \end{pmatrix} \quad (24)$$

Here, (Xleft, Yleft) is assumed to show (Xleft0, Yleft0) to (Xleft3, Yleft3) and (Xright, Yright) is assumed to show (Xright0, Yright0) to (Xright3, Yright3).

When the above is summarized, coordinates (Xleft, Yleft) of the reference rectangle in the correction image of the image photographed by the left imaging unit 21 can be expressed as following Equation (25).

$$\begin{pmatrix} X_{left} \\ Y_{left} \end{pmatrix} = \begin{pmatrix} x \\ y \end{pmatrix} \begin{pmatrix} \cos(\phi+\theta) & -\sin(\phi+\theta) \\ \sin(\phi+\theta) & \cos(\phi+\theta) \end{pmatrix} + \begin{pmatrix} cx + \frac{d_{chart}}{2} \\ cy \end{pmatrix} \quad (25)$$

Moreover, coordinates (Xright, Yright) of the reference rectangle in the correction image of the image photographed by the right imaging unit 21 can be expressed as following Equation (26).

$$\begin{pmatrix} X_{right} \\ Y_{right} \end{pmatrix} = \begin{pmatrix} x \\ y \end{pmatrix} \begin{pmatrix} \cos(\phi+\theta) & -\sin(\phi+\theta) \\ \sin(\phi+\theta) & \cos(\phi+\theta) \end{pmatrix} + \begin{pmatrix} cx - \frac{d_{chart}}{2} \\ cy \end{pmatrix} \quad (26)$$

Therefore, four coordinates of the vertexes of the reference rectangle in the right and left correction images, that is, (Xleft, Yleft) on the left side and (Xright, Yright) on the right side are calculated by substituting, in (x, y), four coordinates (−w/2, h/2), (w/2, h/2), (−w/2, −h/2) and (w/2, −h/2) of the vertexes of the reference rectangle in which the median point is the origin.

Figure 21:
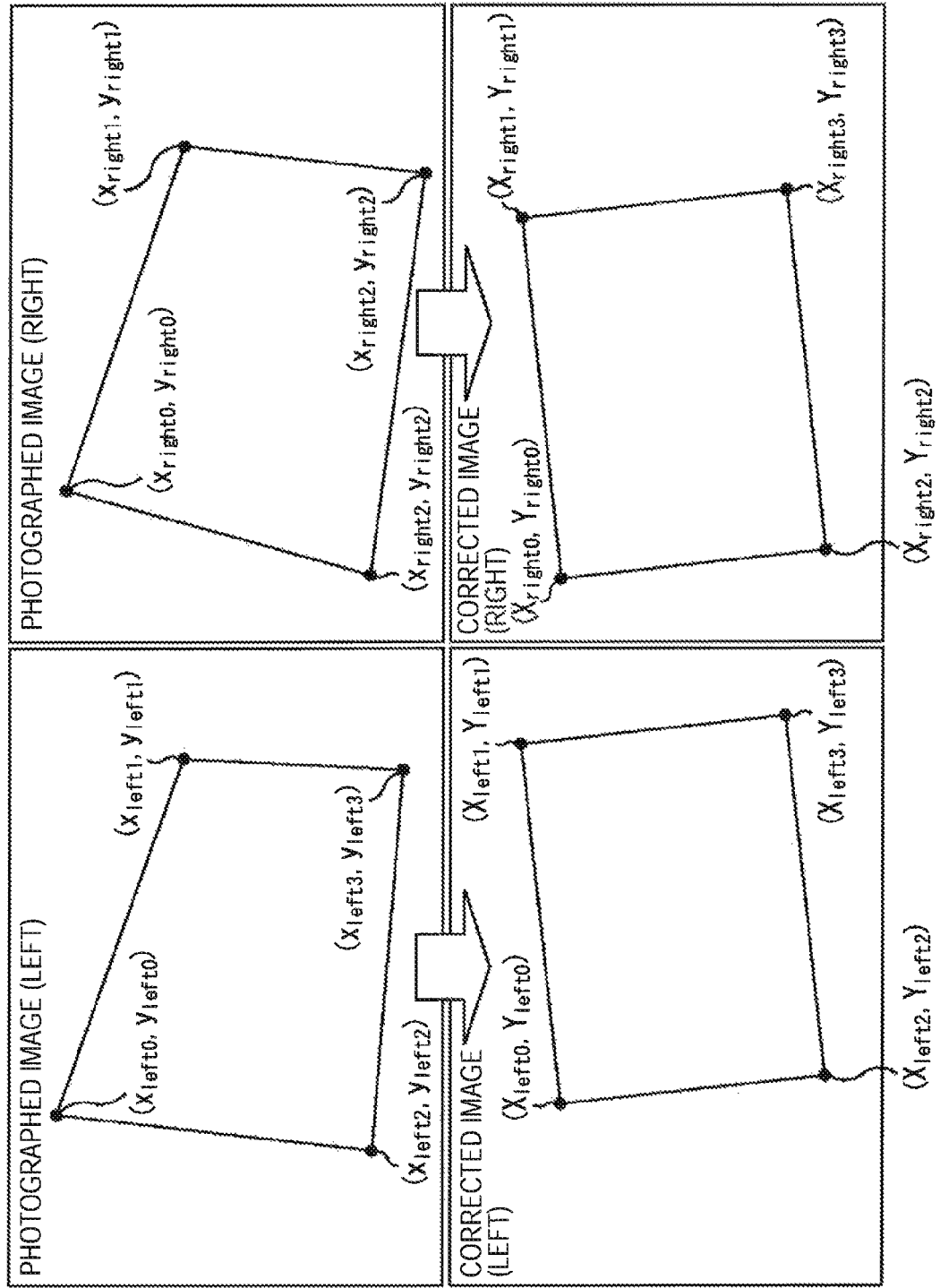
FIG. 21 is a diagram to describe processing performed at the time of generating a correction parameter.

When the relationships between coordinates (Xleft, Yleft) and (Xright, Yright) calculated as above on the correction images and feature point detection coordinates (Xleft, Yleft) and (Xright, Yright) from the images photographed by the imaging units 21-1 and 21-2 are expressed by projection transformation as illustrated in FIG. 21, they are expressed as following Equations (27) and (28).

$$x = \frac{aX + bY + c}{gX + hY + 1} \quad (27)$$

$$y = \frac{dX + eY + f}{gX + hY + 1} \quad (28)$$

Here, (X, Y) is the coordinates of the correction image after projection transformation, (x, y) is the coordinates of the images photographed by the imaging units 21-1 and 21-2 before projection transformation, and variables a, b, c, d, e, f, g and h are correction parameters.

In above Equations 27 and 28, when coordinates (x, y) before projection transformation and coordinates (X, Y) after projection transformation are converted are assumed to be (xn, yn) and (Xn, Yn) (n is between 0 and 3) respectively and correction parameter P equals to (a, b, c, d, e, f, g, h), they can be transformed as following Equation (29).

$$\begin{pmatrix} X_1 & y_1 & 1 & 0 & 0 & 0 & -x_1X_1 & -x_1X_1 \\ 0 & 0 & 0 & X_1 & y_1 & 1 & -x_1X_1 & -x_1X_1 \\ X_2 & y_2 & 1 & 0 & 0 & 0 & -x_2X_2 & -x_2X_2 \\ 0 & 0 & 0 & X_2 & y_2 & 1 & -x_2X_2 & -x_2X_2 \\ X_3 & y_3 & 1 & 0 & 0 & 0 & -x_3X_3 & -x_3X_3 \\ 0 & 0 & 0 & X_3 & y_3 & 1 & -x_3X_3 & -x_3X_3 \\ X_4 & y_4 & 1 & 0 & 0 & 0 & -x_4X_4 & -x_4X_4 \\ 0 & 0 & 0 & X_4 & y_4 & 1 & -x_4X_4 & -x_4X_4 \end{pmatrix} P^T = \begin{pmatrix} 1 \\ 1 \\ 1 \\ 1 \\ 1 \\ 1 \\ 1 \\ 1 \end{pmatrix} \quad (29)$$

By substituting the coordinates of four chart reference points p0 to p3 on the images photographed by the imaging units 21-1 and 21-2 in (xn, yn) of above Equation (29) and substituting vertex coordinates (Xleft, Yleft) and (Xright, Yright) of the reference rectangle in the correction image calculated by Equations (25) and (26) in (Xn, Yn), correction parameter P for the left image and correction parameter P for the right image can be calculated as a solution of simultaneous equations. In the following, correction parameters (P) for the left image and right image photographed by the imaging units 21-1 and 21-2, which are calculated as above, are assumed to be Pleft and Pright, respectively.

The parameter calculation unit 106 calculates the correction parameters as above and stores the calculated correction parameters in the parameter storage unit 61 of the stereo camera 11.

By the above processing, calibration is performed after detecting the tilt between the chart pattern 13 and the stereo camera 11 on the basis of the detected pole 41, and, since the correction parameters are calculated by the calibration, it is possible to realize appropriate calibration even in limited narrow space.

<Depth Detection Processing>

Figure 22:
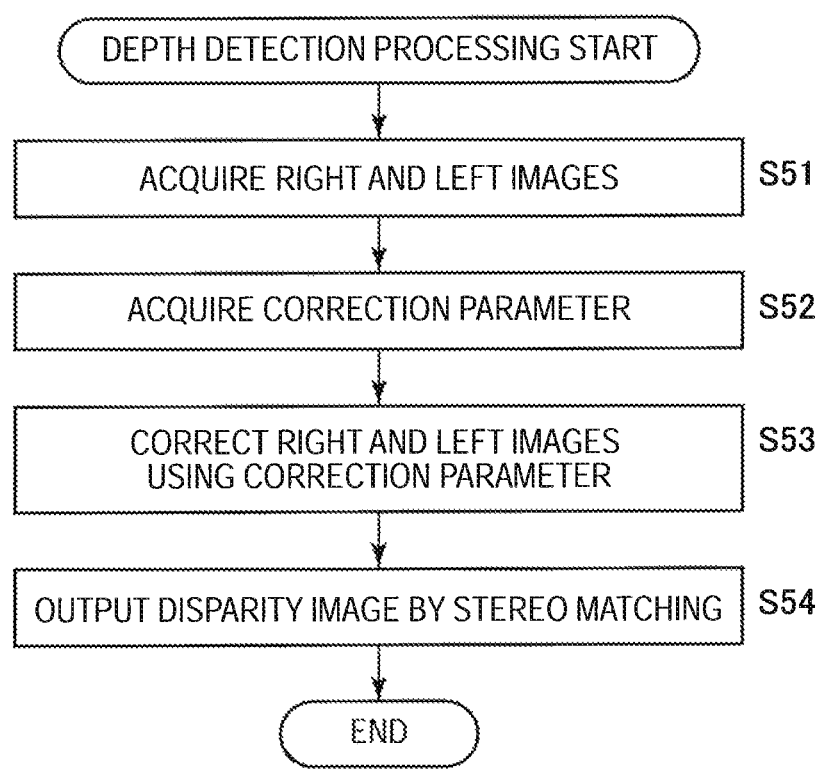
FIG. 22 is a flowchart to describe depth processing.

Next, the depth detection processing is described with reference to the flowchart in FIG. 22.

In step S51, the stereo camera 11 photographs right and left images by the use of the imaging units 21-1 and 21-2 and supplies them to the depth detection unit 14. The image acquisition unit 121 of the depth detection unit 14 acquires the right and left images supplied from the stereo camera 11 and supplies them to the correction unit 123.

In step S52, the parameter acquisition unit 122 accesses the parameter storage unit 61 of the stereo camera 11, reads and acquires the stored correction parameters and supplies them to the correction unit 123.

In step S53, the correction unit 123 corrects the acquired right and left images by the correction parameters and supplies the corrected images to the stereo matching unit 124.

To be more specific, the correction unit 123 performs transformation processing as illustrated in FIG. 21 on the right and left input images photographed by the imaging units 21-1 and 21-2, by the use of correction parameters Pleft and Fright.

Specifically, the correction unit 123 calculates coordinates (x, y) of the right and left input images photographed by the imaging units 21-1 and 21-2, which correspond to coordinates (X, Y) of correction images, by the use of Equations (27) and (28), and maps each pixel value of the correction images onto the right and left input images photographed by the imaging units 21-1 and 21-2. Here, regarding the mapping, it is assumed that pixel supplement is performed by the bilinear method or the like to control aliasing.

In step S54, the stereo matching unit 124 performs stereo matching processing on the basis of the corrected right and left images, calculates the distance in a pixel unit and generates and outputs a depth image (or disparity image) formed with the pixel value based on the distance in a pixel unit.

By the above processing, since it is possible to realize the depth detection processing by the use of the correction parameters calculated by the calibration processing using the chart pattern including the pole, it is possible to easily correct the imaging direction of the imaging units 21-1 and 21-2 of the stereo camera 11 at high accuracy even in limited narrow space and therefore acquire the depth image (or disparity image) at high accuracy.

Also, in the above, although an example has been described where intended correction parameters are calculated by performing the depth detection processing in the depth detection unit 14, correction parameters for a stereo camera for the purpose of taking other images may be calculated. Moreover, in the above, although an example has been described where the correction parameters are calculated in an example using the two imaging units 21-2 and 21-2, correction parameters used at the time of using more imaging units may be calculated.

According to the above, even in a limited space, it is possible to adequately correct the imaging direction of the imaging units in the stereo camera including the plurality of imaging units, and realize imaging by the use of the stereo camera at high accuracy.

The above-described series of processing may be performed by hardware or may be performed by software. When the series of processing is performed by software, a program forming the software is installed into a computer that is incorporated in a dedicated hardware, or installed from a storage medium into a general-purpose personal computer, for example, that can perform various types of functions by installing various types of programs.

Figure 23:
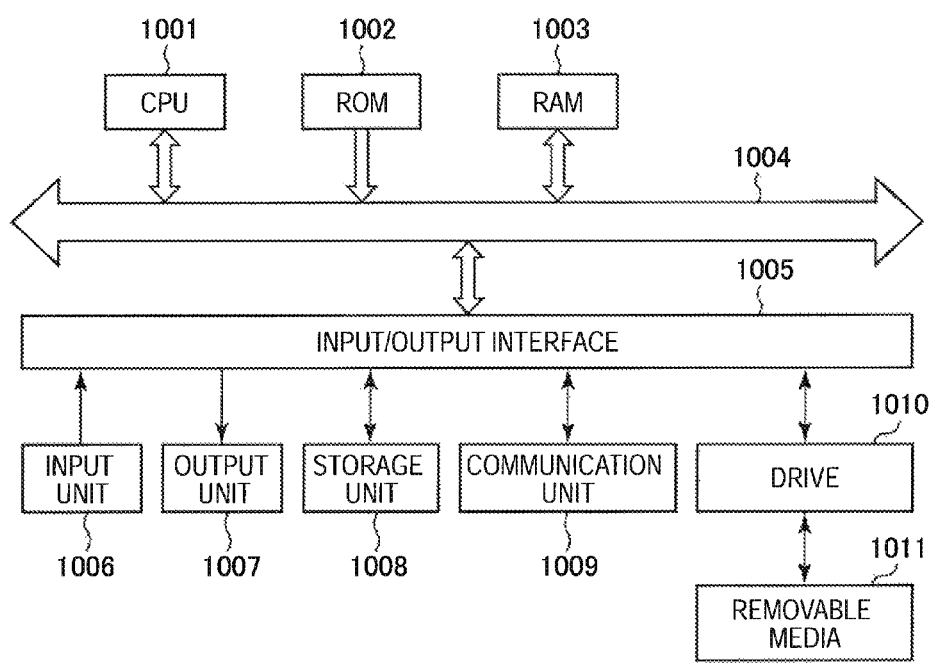
FIG. 23 is a diagram to describe a structure example of a general-purpose personal computer.

FIG. 23 illustrates a configuration example of a general-purpose personal computer. This personal computer incorporates a CPU (Central Processing Unit) 1001. The CPU 1001 is connected to an input/output interface 1005 through a bus 1004. The bus 1004 is connected to a ROM (Read Only Memory) 1002 and a RAM (Random Access Memory) 1003.

The input/output interface 1005 is connected to: an input unit 1006 including a keyboard to input an operation command by the user and an input device such as a mouse; an output unit 1007 that outputs an image of an processing operation screen or processing result to a display device; a storage unit 1008 including a hard disk drive storing programs and various kinds of data; and a communication unit 1009 that performs communication processing through a network represented by the Internet by the use of the LAN (Local Area Network). Moreover, a drive 1010 to read and write data is connected to removable media 1011 such as a magnetic disk (including a flexible disk), an optical disc (including a CD-ROM (Compact Disc-Read Only Memory) and a DVD (Digital Versatile Disc)), a magneto optical disk (including a MD (Mini Disc)) and a semiconductor memory.

The CPU 1001 performs various kinds of processing according to programs stored in the ROM 1002 or programs which are read from the removable media 1011 such as the magnetic disk, the optical disc, the magneto optical disk and the semiconductor memory, installed in the storage unit 1008 and loaded from the storage unit 1008 onto the RAM 1003. The RAM 1003 adequately stores data demanded to perform various kinds of processing in the CPU 1001.

In the computer configured as described above, the CPU 1001 loads a program that is stored, for example, in the storage unit 1008 onto the RAM 1003 via the input/output interface 1005 and the bus 1004, and executes the program, Thus, the above-described series of processing is performed.

Programs to be executed by the computer (the CPU 1001) are provided being recorded in the removable media 1011 which is a packaged media or the like. Also, programs may be provided via a wired or wireless transmission media, such as a local area network, the Internet or digital satellite broadcasting.

In the computer, by inserting the removable media 1011 into the drive 1010, the program can be installed in the storage unit 1008 via the input/output interface 1005. Further, the program can be received by the communication unit 1009 via a wired or wireless transmission media and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flowchart can be executed by one apparatus or by allocating a plurality of apparatuses.

In addition, in the case where a plurality of processes is included in one step, the plurality of processes included in this one step can be executed by one apparatus or by allocating a plurality of apparatuses.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
multiple imaging units included in a stereo camera, the multiple imaging units configured to photograph a chart pattern including a pole; and
a correction parameter calculation unit configured to calculate a correction parameter that corrects a gap between the multiple imaging units, based on the pole and a pattern included in the chart pattern photographed by the multiple imaging units.

(2) The image processing apparatus according to (1), wherein the pole includes a disk portion in a tip and a side shape of the tip is T-shaped.

(3) The image processing apparatus according to (1), further including:
a pole detection unit configured to detect the pole included in the chart pattern photographed by the multiple imaging units;
a tilt detection unit configured to detect a tilt of the chart pattern based on the pole detected by the pole detection unit;
a detection unit configured to detect a feature point based on the pattern included in the chart pattern photographed by the multiple imaging units; and
a feature point correction unit configured to correct arrangement of the feature point detected by the detection unit, based on the tilt detected by the tilt detection unit,
wherein the correction parameter calculation unit calculates the correction parameter that corrects the gap between the multiple imaging units, based on information on the feature point whose arrangement is corrected by the feature point correction unit.

(4) The image processing apparatus according to wherein the chart pattern includes a box chart and a lattice point chart.

(5) An image processing method including:
photographing a chart pattern including a pole by multiple imaging units included in a stereo camera; and
calculating a correction parameter that corrects a gap between the multiple imaging units, based on the pole and a pattern included in the chart pattern photographed by the multiple imaging units.

(6) A program for causing a computer that controls an image processing apparatus to execute:
photographing a chart pattern including a pole by multiple imaging units included in a stereo camera; and
calculating a correction parameter that corrects a gap between the multiple imaging units, based on the pole and a pattern included in the chart pattern photographed by the multiple imaging units.

(7) An image processing system including:
an image processing apparatus configured to include multiple imaging units; and
a chart pattern configured to perform calibration in an imaging direction of each of the imaging units,
wherein the chart pattern is installed in a position facing the multiple imaging units and includes a pattern as a feature point and a pole, and
wherein the image processing apparatus includes the multiple imaging units that are included in a stereo camera and photograph the chart pattern, and a correction parameter calculation unit that calculates a correction parameter which corrects a gap between the multiple imaging units, based on the pole and a pattern included in the chart pattern photographed by the multiple imaging units.

What is claimed is:

1. An image processing apparatus comprising:
multiple imaging units included in a stereo camera, the multiple imaging units configured to photograph a chart pattern including a pole; and
a correction parameter calculation unit configured to calculate a correction parameter that corrects a gap between the multiple imaging units, based on the pole and a pattern included in the chart pattern photographed by the multiple imaging units.

2. The image processing apparatus according to claim 1, wherein the pole includes a disk portion in a tip and a side shape of the tip is T-shaped.

3. The image processing apparatus according to claim 1, further comprising:
a pole detection unit configured to detect the pole included in the chart pattern photographed by the multiple imaging units;
a tilt detection unit configured to detect a tilt of the chart pattern based on the pole detected by the pole detection unit;
a detection unit configured to detect a feature point based on the pattern included in the chart pattern photographed by the multiple imaging units; and
a feature point correction unit configured to correct arrangement of the feature point detected by the detection unit, based on the tilt detected by the tilt detection unit,
wherein the correction parameter calculation unit calculates the correction parameter that corrects the gap between the multiple imaging units, based on information on the feature point whose arrangement is corrected by the feature point correction unit.

4. The image processing apparatus according to claim 1, wherein the chart pattern includes a box chart and a lattice point chart.

5. The image processing apparatus according to claim 1, wherein the pole is installed at a position protruding from the chart pattern.

6. The image processing apparatus according to claim 1, wherein the pole is formed of a disk portion and a prop portion.

7. The image processing apparatus according to claim 6, wherein the prop portion is installed at a position of chart pattern, and the disk portion is formed upon an end of the prop portion that is protruded from the chart pattern.

8. The image processing apparatus according to claim 1, wherein the chart pattern is a planar chart pattern.

9. The image processing apparatus according to claim 1, wherein the correction parameter calculation unit calculates the correction parameter that corrects the gap between the multiple imaging units, based on a shift amount of the pole and the pattern included in the chart pattern.

10. The image processing apparatus according to claim 1, wherein the chart pattern includes a plurality of poles.

11. An image processing method comprising:
photographing a chart pattern including a pole by multiple imaging units included in a stereo camera; and
calculating a correction parameter that corrects a gap between the multiple imaging units, based on the pole and a pattern included in the chart pattern photographed by the multiple imaging units.

12. A non-transitory computer-readable medium having embodied thereon a program, which when executed by a computer causes the computer to perform a method, the method comprising:

photographing a chart pattern including a pole by multiple imaging units included in a stereo camera; and calculating a correction parameter that corrects a gap between the multiple imaging units, based on the pole and a pattern included in the chart pattern photographed by the multiple imaging units.

13. An image processing system comprising:

an image processing apparatus configured to include multiple imaging units; and a chart pattern configured to perform calibration in an imaging direction of each of the imaging units, wherein the chart pattern is installed in a position facing the multiple imaging units and includes a pattern as a feature point and a pole, and wherein the image processing apparatus includes the multiple imaging units that are included in a stereo camera and photograph the chart pattern, and a correction parameter calculation unit that calculates a correction parameter which corrects a gap between the multiple imaging units, based on the pole and a pattern included in the chart pattern photographed by the multiple imaging units.

* * * * *

UNITED STATES PATENT AND TRADEMARK OFFICE
CERTIFICATE OF CORRECTION

| | | |
|---|---|---|
| PATENT NO. | : 8,878,944 B2 | Page 1 of 1 |
| APPLICATION NO. | : 14/044215 | |
| DATED | : November 4, 2014 | |
| INVENTOR(S) | : Nodoka Tokunaga et al. | |

It is certified that error appears in the above-identified patent and that said Letters Patent is hereby corrected as shown below:

On the title page item (73) in the Assignee section, please ADD "Sony Computer Entertainment Inc., Tokyo, Japan".

Signed and Sealed this
Twenty-seventh Day of January, 2015

Michelle K. Lee
*Deputy Director of the United States Patent and Trademark Office*